(12) United States Patent
Ladd

(10) Patent No.: US 9,846,032 B2
(45) Date of Patent: Dec. 19, 2017

(54) SYSTEMS, METHODS, AND COMPUTER-READABLE MEDIA FOR THREE-DIMENSIONAL FLUID SCANNING

(76) Inventor: John William Ladd, Santa Clara, CA (US)

( * ) Notice: Subject to any disclaimer, the term of this patent is extended or adjusted under 35 U.S.C. 154(b) by 909 days.

(21) Appl. No.: 14/113,908

(22) PCT Filed: Apr. 25, 2012

(86) PCT No.: PCT/US2012/035049
§ 371 (c)(1),
(2), (4) Date: Oct. 25, 2013

(87) PCT Pub. No.: WO2012/149055
PCT Pub. Date: Nov. 1, 2012

(65) Prior Publication Data
US 2014/0052407 A1    Feb. 20, 2014

Related U.S. Application Data

(60) Provisional application No. 61/510,470, filed on Jul. 21, 2011, provisional application No. 61/510,465, (Continued)

(51) Int. Cl.
*G01B 11/24* (2006.01)
*G01B 13/16* (2006.01)
(Continued)

(52) U.S. Cl.
CPC .............. *G01B 13/16* (2013.01); *G01B 13/20* (2013.01); *B33Y 50/00* (2014.12)

(58) Field of Classification Search
CPC .................................. G01B 13/16; G01B 13/20
(Continued)

(56) References Cited

U.S. PATENT DOCUMENTS 2,968,210 A    1/1961  Perrozzi et al.
4,887,231 A   12/1989  Ratliff et al.
(Continued)

FOREIGN PATENT DOCUMENTS

DE    19631205 C2    7/1998
RU     2209343 C2    7/2003

OTHER PUBLICATIONS

Paul A. Webb, "Volume and Density Determinations for Particle Technologists", Feb. 16, 2001, Micromeritics Instrument Corp. pp. 1-16.*
(Continued)

*Primary Examiner* — Eman Alkafawi
(74) *Attorney, Agent, or Firm* — Robert W. Morris; Eckert Seamans Cherin & Mellott, LLC

(57) ABSTRACT

Systems, methods, for three-dimensional ("3D") and computer-readable media fluid scanning are provided. According to some embodiments, there is provided a method that may include adding a first predetermined amount of fluid into a container, measuring a first fluid height in the container after the adding the first predetermined amount of fluid, adding a second predetermined amount of fluid into the container when the first predetermined amount of fluid is in the container, measuring a second fluid height in the container after the adding the second predetermined amount of fluid, emptying the fluid from the container.

6 Claims, 25 Drawing Sheets

Related U.S. Application Data filed on Jul. 21, 2011, provisional application No. 61/502,663, filed on Jun. 29, 2011, provisional application No. 61/478,904, filed on Apr. 25, 2011, provisional application No. 61/510,467, filed on Jul. 21, 2011.

(51) Int. Cl.
*G01B 13/20* (2006.01)
*B33Y 50/00* (2015.01)

(58) Field of Classification Search
USPC ......... 702/167, 171, 172, 152, 153; 382/145
See application file for complete search history.

(56) References Cited

U.S. PATENT DOCUMENTS

| | | | |
|---|---|---|---|
| 6,098,029 A | 8/2000 | Takagi et al. | |
| 8,041,550 B1 * | 10/2011 | Thuerey | G06F 17/5009 703/5 |
| 2010/0008566 A1 | 1/2010 | Lin et al. | |

OTHER PUBLICATIONS

European Search Report Application No. EP 12 77 6414, Dated Nov. 27, 2014.
International Search Report of PCT/US2012/035049, dated Jul. 17, 2012.

\* cited by examiner

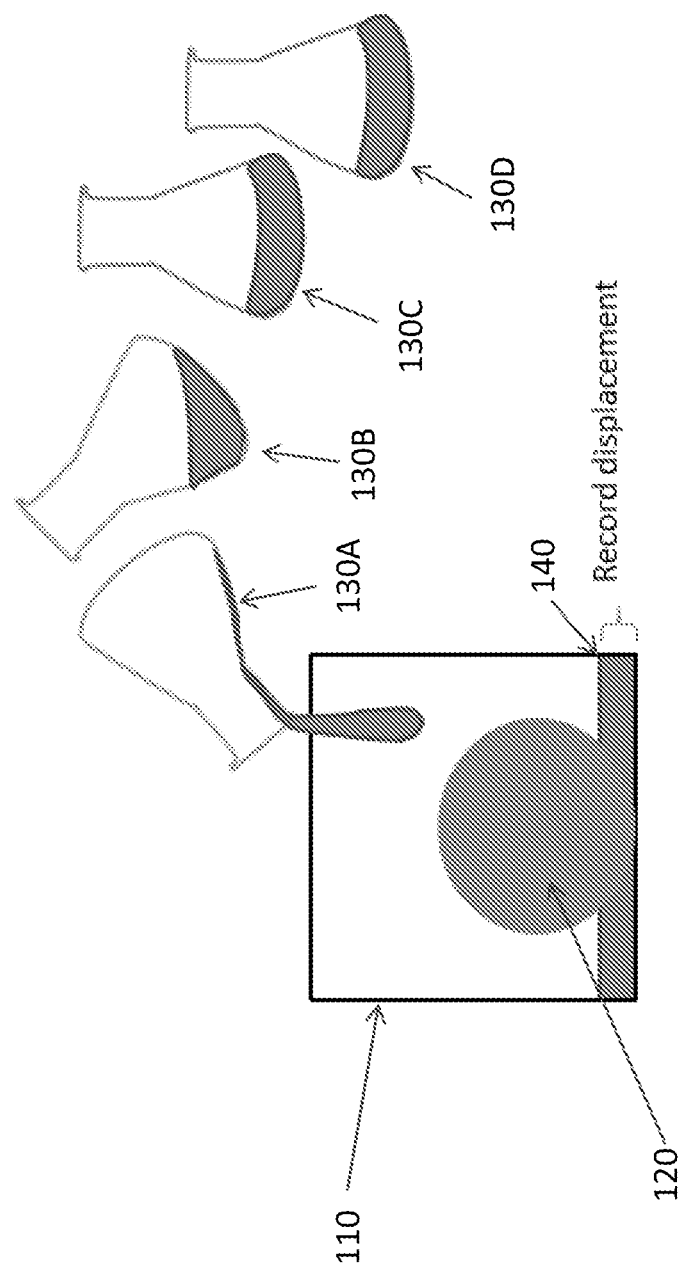

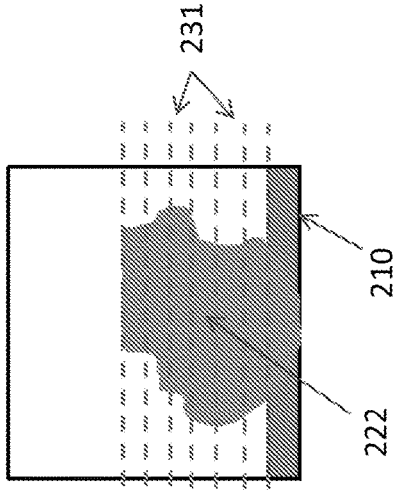
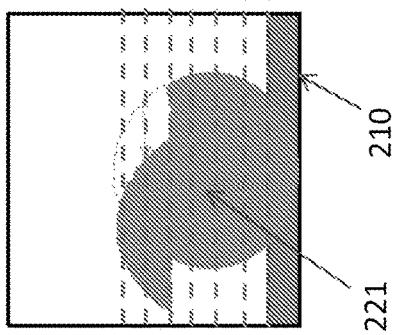
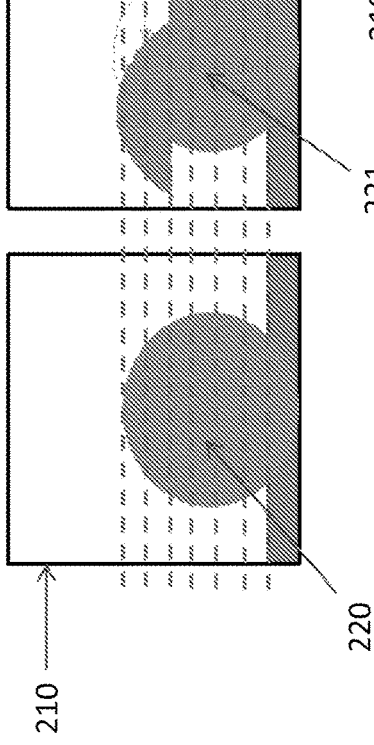
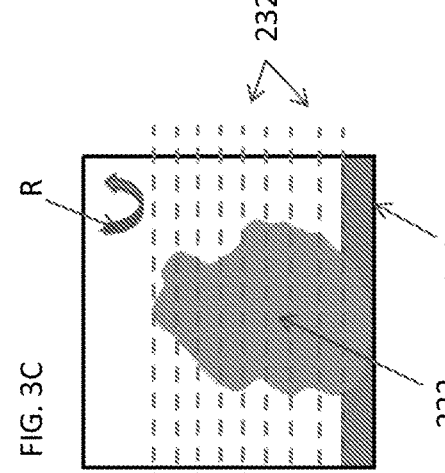
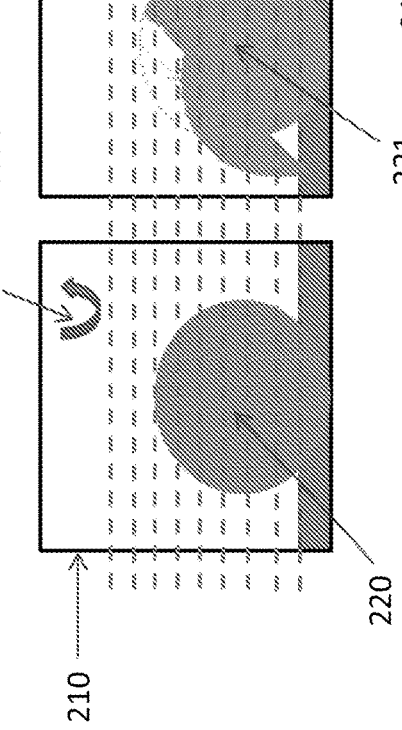

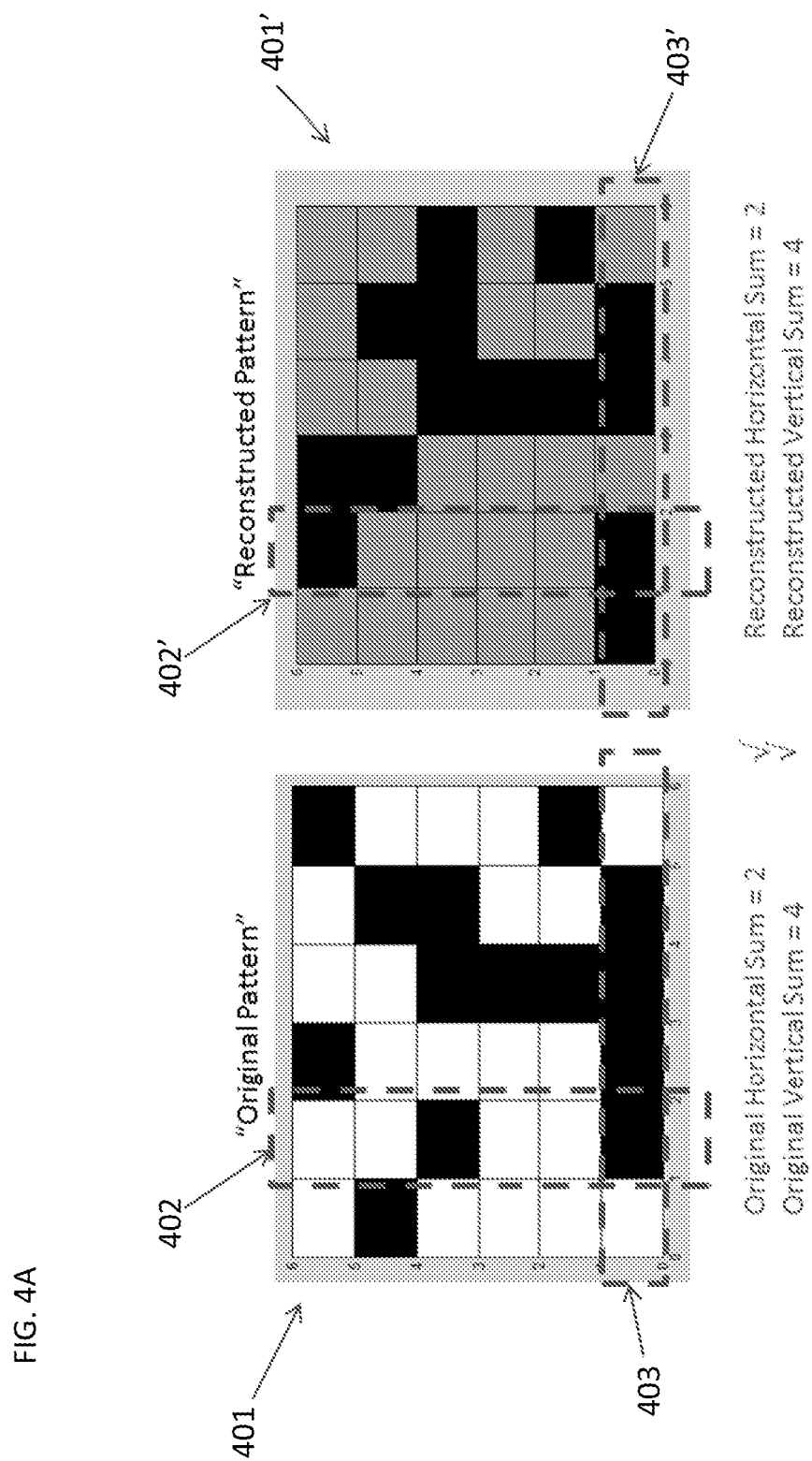

1000

1100

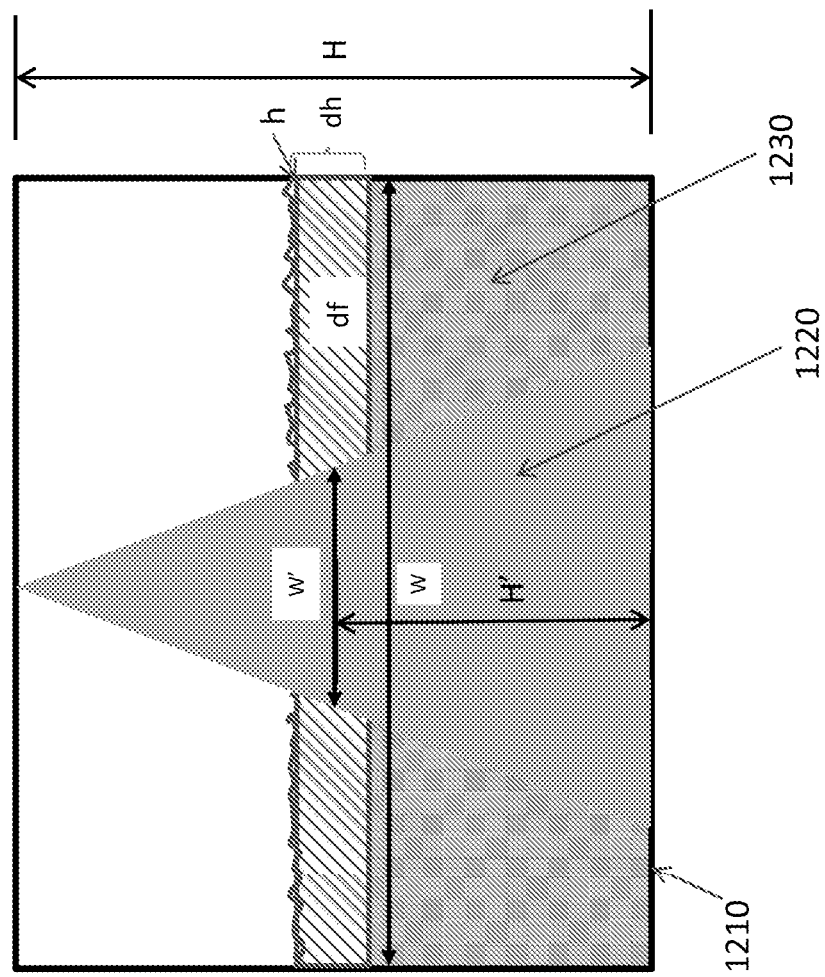

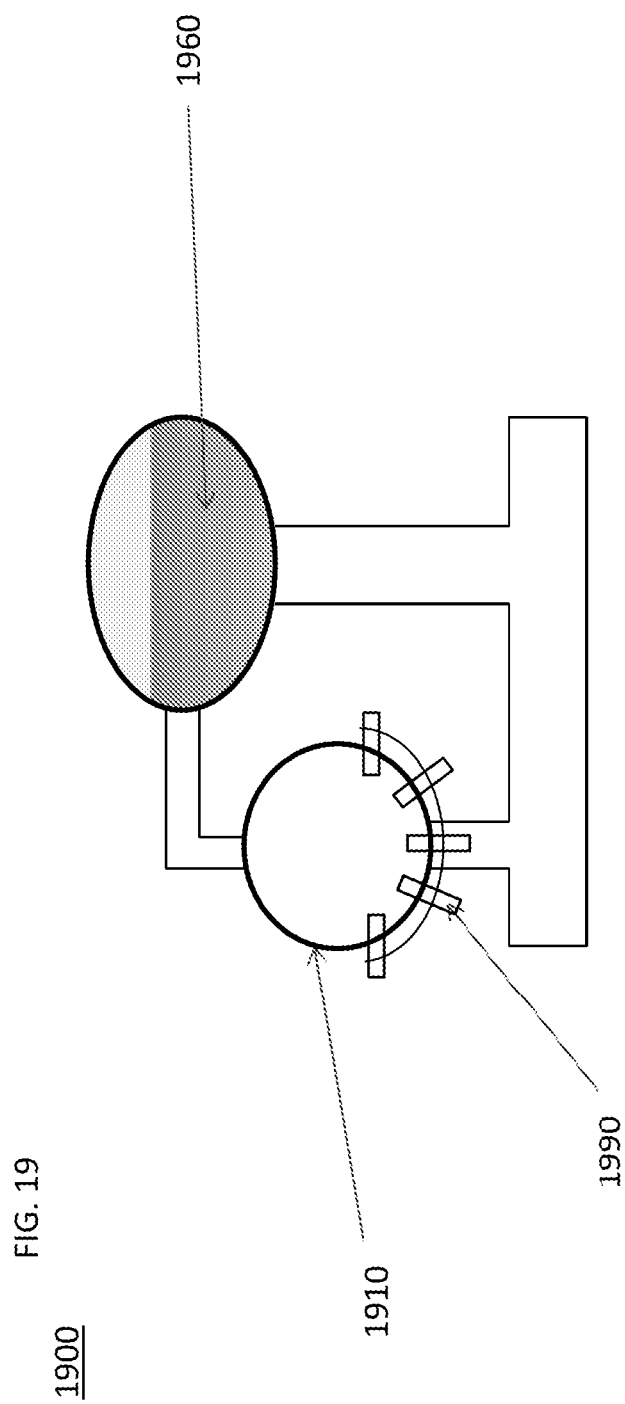

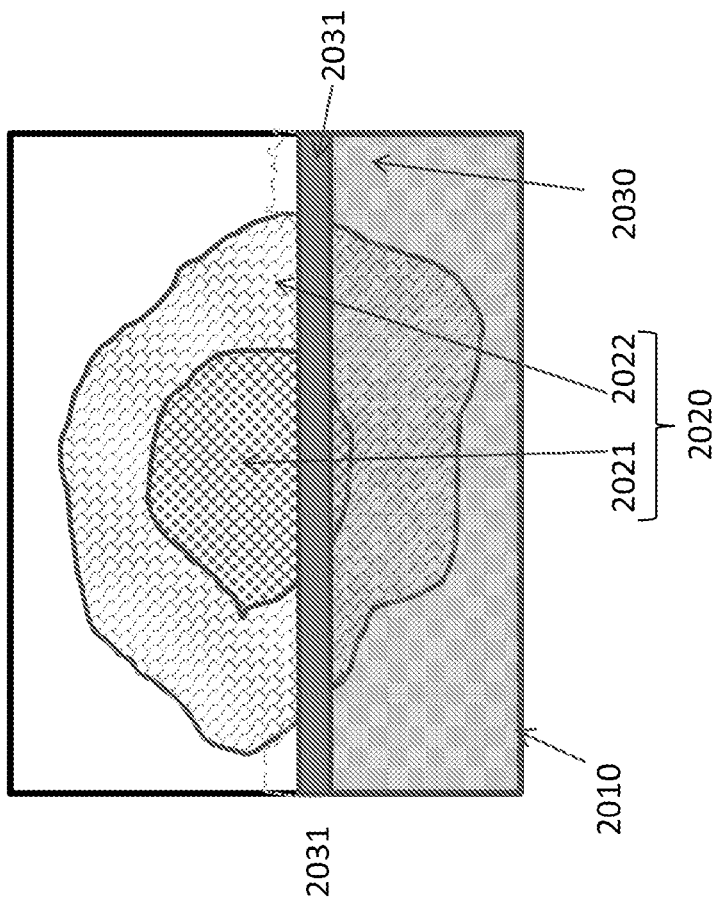
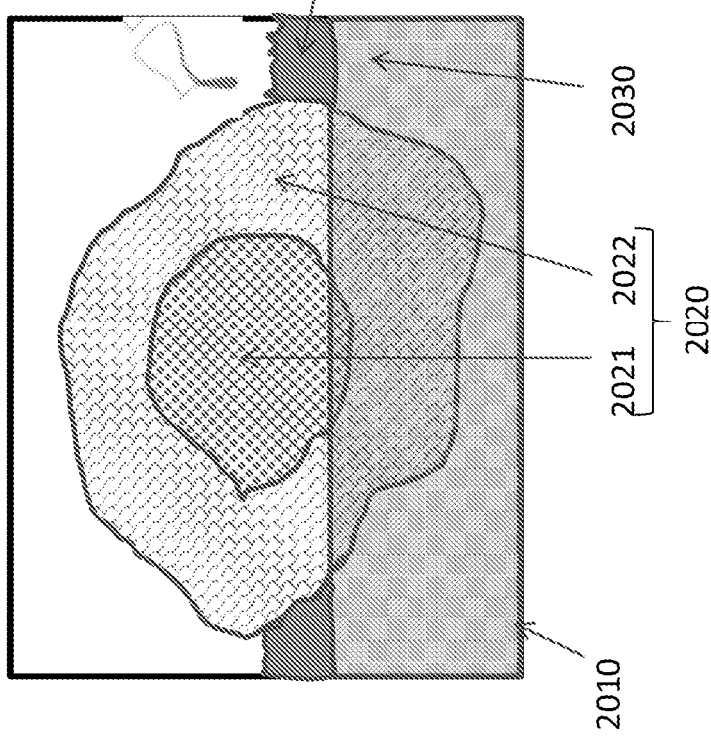

2300

SYSTEMS, METHODS, AND COMPUTER-READABLE MEDIA FOR THREE-DIMENSIONAL FLUID SCANNING

CROSS-REFERENCE TO RELATED APPLICATIONS

This application claims the benefit of U.S. Provisional Patent Application No. 61/478,904, filed Apr. 25, 2011, U.S. Provisional Patent Application No. 61/502,663, filed Jun. 29, 2011, U.S. Provisional Patent Application No. 61/510,465, filed Jul. 21, 2011, U.S. Provisional Patent Application No. 61/510,467, filed Jul. 21, 2011, and U.S. Provisional Patent Application No. 61/510,470, filed Jul. 21, 2011, each of which is hereby incorporated by reference herein in its entirety.

FIELD OF THE INVENTION

This can relate to systems, methods, and computer-readable media for three-dimensional ("3D") fluid scanning.

BACKGROUND OF THE DISCLOSURE 3D scanners are commonly employed to collect data on the shape and possibly the appearance (e.g., color) of an object. The collected data can then be used to construct a digital, 3D model of the object. One of the most commonly used 3D scanners is the optical scanner. Many types of optical scanners can be used to collect data on the shape of the object, and each type comes with its own advantages, limitations, and costs. For example, optical scanners often have trouble imaging certain media or objects (e.g., transparent objects, highly reflective or absorptive objects, and/or objects with features beyond line of sight) because they may rely on the reflection of light from a surface of the object, and they may have limited dynamic range.

Accordingly, what is needed are apparatus and methods for accurately reconstructing the 3D shape of an object regardless of some of the optical or geometric properties of the object.

SUMMARY OF THE DISCLOSURE

Systems, methods, and computer-readable media for three-dimensional ("3D") fluid scanning are provided.

According to some embodiments, there is provided a method that may include adding a first predetermined amount of fluid into a container, measuring a first fluid height in the container after the adding the first predetermined amount of fluid, adding a second predetermined amount of fluid into the container when the first predetermined amount of fluid is in the container, measuring a second fluid height in the container after the adding the second predetermined amount of fluid, emptying the fluid from the container, positioning an object into the container at a first orientation with respect to the container, re-adding the first predetermined amount of fluid into the container when the object is positioned in the container at the first orientation, measuring a third fluid height in the container after the re-adding the first predetermined amount of fluid, re-adding the second predetermined amount of fluid into the container when the object is positioned in the container at the first orientation and when the first predetermined amount of fluid is in the container, measuring a fourth fluid height in the container after the re-adding the second predetermined amount of fluid, and generating a three-dimensional image of the object using the first measured fluid height, the second measured fluid height, the third measured fluid height, and the fourth measured fluid height. After the measuring the fourth fluid height, in some embodiments, the method may also include emptying the fluid from the container, positioning the object into the container at a second orientation with respect to the container, re-re-adding the first predetermined amount of fluid into the container when the object is positioned in the container at the second orientation, measuring a fifth fluid height in the container after the re-re-adding the first predetermined amount of fluid, re-re-adding the second predetermined amount of fluid into the container when the object is positioned in the container at the second orientation and when the first predetermined amount of fluid is in the container, and measuring a sixth fluid height in the container after the re-re-adding the second predetermined amount of fluid. In some such embodiments, the generating the three-dimensional image of the object may include generating the three-dimensional image of the object using the first measured fluid height, the second measured fluid height, the third measured fluid height, the fourth measured fluid height, the fifth measured fluid height, and the sixth measured fluid height.

According to some embodiments, there is provided a method that may include measuring fluid displacement of an object within a container at various orientations of the object with respect to the container, populating a linear model with the fluid displacement measurements, and solving the linear model to obtain a solution for the mass density of the object. In some embodiments, the method may also include applying a solver routine to the solution to obtain an updated model, and generating a three-dimensional image of the object based on the updated model. In some such embodiments, after the solving, the method may also include at least one of rounding mass density results of the solution and removing at least one voxel from the solution.

BRIEF DESCRIPTION OF THE DRAWINGS

The above and other aspects of the invention, its nature, and various features will become more apparent upon consideration of the following detailed description, taken in conjunction with the accompanying drawings, in which like reference characters may refer to like parts throughout, and in which:

FIG. 1 shows an illustrative depiction of a measuring system and measurement techniques used in accordance with some embodiments of the invention;

FIGS. 2A-2C show illustrative depictions of a measuring system and measurement techniques used on various objects in accordance with some embodiments of the invention;

FIGS. 3A-3C show illustrative depictions of the measuring system and measurement techniques of FIGS. 2A-2C but with the various objects rotated by a rotation angle R;

FIGS. 4A-4C show illustrative original two-dimensional ("2D") mass patterns and reconstructed two-dimensional mass patterns using techniques in accordance with some embodiments of the invention;

FIG. 12 shows an illustrative depiction of a measuring system and measurement techniques used in accordance with some embodiments of the invention;

FIG. 19 shows an illustrative 3D fluid scanning system in accordance with some embodiments of the invention;

FIGS. 20A and 20B show an illustrative DUT within a container at different stages of a technique that may be used in accordance with some embodiments of the invention;

DETAILED DESCRIPTION

Systems, methods, and computer-readable media for three-dimensional ("3D") fluid scanning are provided and discussed with reference to FIGS. 1-24.

FIG. 1 includes a 3D measuring system 100 in accordance with some embodiments of the invention. Measuring system 100 can include a container 110, a device under test 120 ("DUT"), and a plurality of predetermined fluid amounts (e.g., predetermined fluid quantities 130A-130D). Although four predetermined fluid amounts are shown in FIG. 1, those skilled in the art will appreciate that any suitable number of predetermined fluid amounts may be used in accordance with the invention. Predetermined fluid quantities 130A-130D can be made of any suitable material including, for example, fluorine-carbon fluid (e.g., with a fluid with low intermolecular forces), Flourinert (e.g., FC-72), alcohol, water, sand, barium, silicon, or oil.

Container 110 may be fluid tight such that predetermined fluid quantities 130A-130D may be unable to escape from container 110. Container 110 may be any suitable shape including, but not limited to, cubic, hexahedral, dodecahedral, icosahedral, or combinations thereof. Container 110 may have any suitable volume. In some embodiments, the volume of container 110 may closely match but be at least slightly greater than the volume of DUT 120. Container 110 may be made of any suitable material, including, but not limited to, metal, plastic, ceramic, or combinations thereof.

Figure 11:
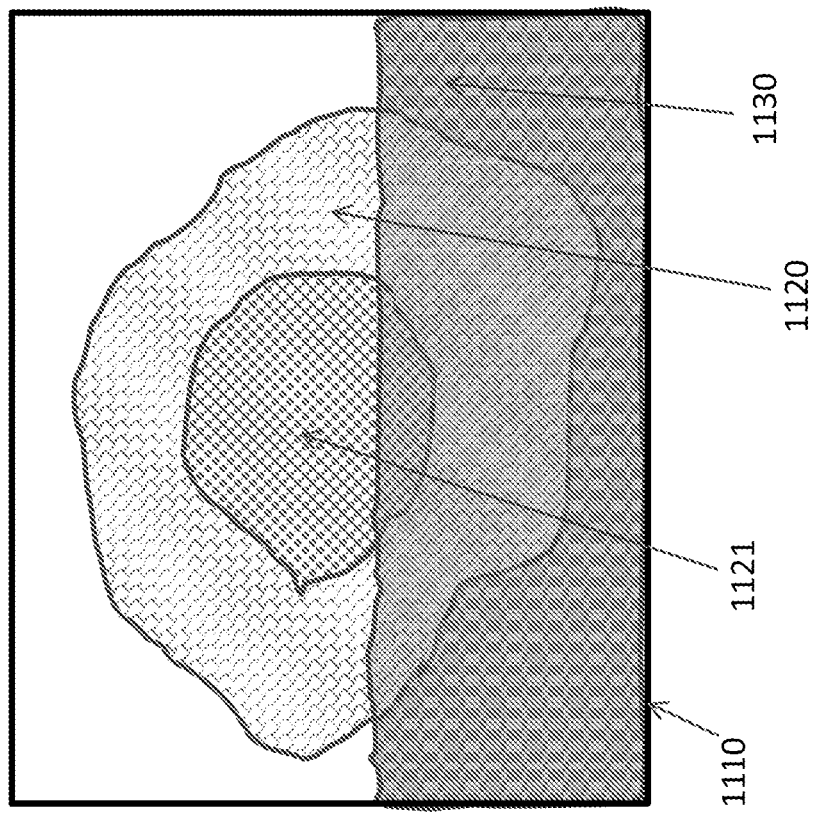
FIG. 11 shows an illustrative DUT that may be multiple distinct and independent objects in accordance with some embodiments of the invention.

DUT 120, which may be shown as a sphere in FIG. 1, can be any arbitrary object or any arbitrary combination of objects for which a user may wish to reconstruct the 3D shape. DUT 120 may have any suitable geometry or any combination of geometries. Additionally, DUT 120 may have any arbitrary optical properties. For example, DUT 120 may be transparent, highly reflective, highly absorptive, or combinations thereof. If DUT 120 is a collection of objects or an object with a complex geometry, DUT 120 may have one or more features which may not be visible from an exterior line of sight. In some embodiments, DUT 120 may be multiple distinct and independent objects placed in container 110. For example, as seen in FIG. 11, DUTs 1120 and 1121 may be placed in container 1110 of a measuring system 1100 in accordance with some embodiments. DUT 1121 may have a well-defined porous density distribution while DUT 1120 may have a different porous density distribution. In some embodiments, DUT 1121 may be a solid medium with no pores. In other embodiments, DUT 1121 may have the density of a gas (e.g., DUT 1121 may be a cavity in DUT 1120). In other embodiments, DUT 1120 may not fully enclose DUT 1121. An optical scanner, which may rely on reflection or transmission of light, can only detect the outside shape of DUT 1120. The optical scanner may be unable to detect the outer shape of DUT 1121, which may be outside the line-of-sight of the optical scanner. Displacement measurements of fluid quantity 1130 within container 1110 may not need an optical line-of-sight to map an interior cavity or porous distribution of the DUT(s) in container 1110. For example, fluid quantity 1130 may penetrate both DUT 1120 and DUT 1121, and the displacement of fluid quantity 1130 may be found as a function of height of the DUT(s) and/or angle of measurement. In embodiments where DUT 1121 is a solid medium, fluid quantity 1130 may only penetrate DUT 1120.

Returning to FIG. 1, the function of measuring system 100 can be understood from the concept of incremental fluid displacement recording. At least one DUT 120 may be placed within container 110 to begin a measuring process. Although FIG. 1 shows DUT 120 on the floor of container 110, it is to be understood that DUT 120 may be suspended within container 110 in any suitable manner (see, e.g., immersion cage 850 of FIG. 8). Predetermined fluid quantity 130A may then be added to container 110 in order to begin submerging DUT 120. In some embodiments, DUT 120 may be fixed within container 110 so that it does not float or move during submerging. After predetermined fluid quantity 130A is added, the fluid height 140 in container 110 may be determined and recorded. Any suitable recording methods can be used to determine the fluid height 140 in container 110 including, but not limited to, rulers, capacitive probes, cameras, or combinations thereof. Once the fluid height 140 is recorded for predetermined fluid quantity 130A, predetermined fluid quantity 130B may then be added to container 110 to further submerge DUT 120. After predetermined fluid quantity 130B is added, the fluid height 140 in container 110 may again be determined and recorded. The process of adding predetermined fluid amounts and recording the fluid height of container 110 may continue until DUT 120 is fully submerged in fluid. Although four predetermined fluid quantities 130A-130D are shown in FIG. 1, it is to be understood that any suitable number of predetermined fluid amounts may be used in accordance with various embodiments. For example, a capacitance meter (see, e.g., FIG. 9) may be used to measure a large number of samples of fluid height 140 per second (e.g., 100 samples per second or more) as fluid may be continuously supplied at a suitable rate to container 110.

Incremental recording of the displacement of fluid that may be used for submerging DUT 120 may allow a specific displacement profile for DUT 120 to be measured. The specific displacement profile may indicate how the incremental volume, or slice, of DUT 120 changes as a function of fluid height 140. A two-dimensional example of an incremental recording process can be seen in FIGS. 12-13C in accordance with some embodiments. As shown in FIG. 12, DUT 1220 may be placed in container 1210 (e.g., resting on the bottom of container 1210). Container 1210 may have width W and height H. At a given height of DUT 1220 (e.g., at a height H'), DUT 1220 may have width W'. As incremental amounts of fluid are added to fluid quantity 1230, the differential fluid height dh may be recorded for a particular amount of fluid added to container 1210. The differential slice area df can then be approximated by the following formula (1):

$$df \approx (W-W') \times dh$$

In some embodiments, all four parameters of formula (1) may be a function of fluid height h of fluid quantity 1230 within container 1210. In the limit where differential slice area df is made arbitrarily small, formula (1) may become exact. Thus, fluid displacement of DUT 1220 as a function of fluid height h may be calculated as formula (2):

$$W'(h) = W(h) - \frac{df}{dh}$$

Figure 13A:
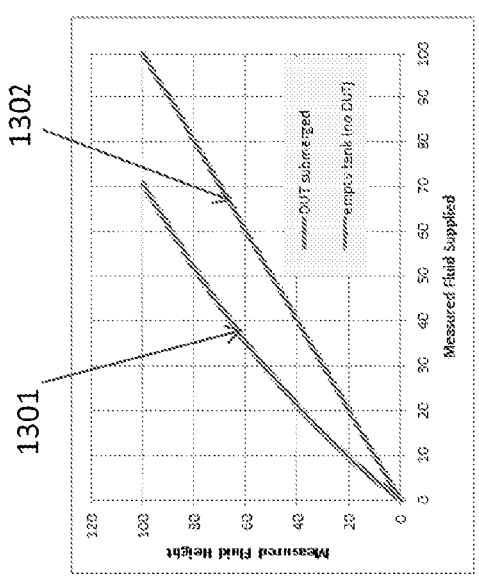
FIGS. 13A-13C show illustrative depictions of measurement techniques used in accordance with some embodiments of the invention.
Figure 13B:
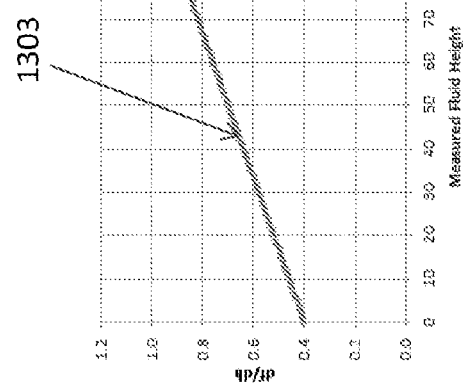
Figure 13C:
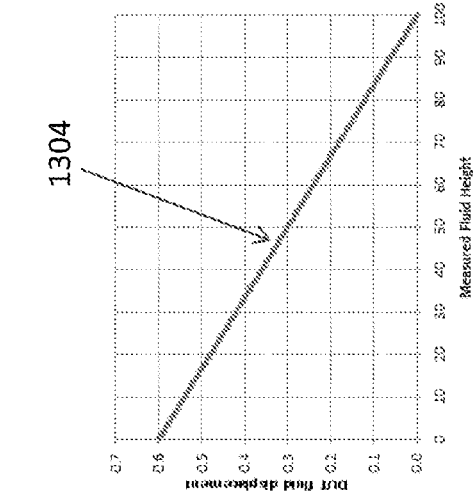

FIGS. 13A-13C show an illustrative process of converting measured data from the incremental recording process outlined with respect to FIG. 12 to a displacement profile for DUT 1220. FIG. 13A shows two traces (e.g., traces 1301 and 1302) of fluid height h, which may be measured as a function of fluid quantity 1230 supplied to container 1210, for two cases (e.g., (i) an empty container 1210 or a container 1210 with an immersion cage (i.e., trace 1302) and (ii) container 1210 with DUT 1220 or container 1210 with an immersion cage and DUT 1220 (i.e., trace 1301)). Trace 1301 may represent the measured fluid height h as a function of fluid quantity 1230 supplied that would be expected if DUT 1220 were placed in container 1210 and measurements were taken (e.g., using the incremental recording process outlined with respect to FIG. 12). Trace 1302 may represent the measured fluid height h as a function of fluid quantity 1230 supplied that would be expected if no DUT were placed in container 1210 and measurements were taken (e.g., using the incremental recording process outlined with respect to FIG. 12). Although not shown in FIG. 12, it is understood that DUT 1220 may be suspended within container 1210 in any suitable manner (see, e.g., immersion cage 850 of FIG. 8) in accordance with some embodiments. Using the data from graph 1300A of FIG. 13A, the slope of fluid height h versus fluid quantity 1230 supplied as a function of measured fluid height h may be calculated. For example, trace 1303 graph 1300B of FIG. 13B may show differential slice area df divided by differential fluid height dh as a function of fluid height h. By subtracting the data in FIG. 13B (e.g., trace 1303) from width W of container 1210, DUT 1220 fluid displacement versus fluid height h may be calculated (e.g., trace 1304 of graph 1300C of FIG. 13C). In FIG. 12, container 1220 may be shown as having a constant width W, but it is to be understood that container 1220 may have any suitable width W as a function of height H. In three dimensions, the procedure outlined with respect to FIGS. 12-13C may be applied in the same manner, except that the fluid quantity supplied would represent a true volume instead of an area, and the displacement "slice" would represent a volume.

Those skilled in the art will appreciate that different objects (e.g., different DUTs 120) may produce substantially similar displacement profiles for a specific orientation of the different objects relative to gravity. For example, as shown in FIGS. 2A and 2B, respective DUTs 220 and 221 may have similar displacement profiles when measured at recording intervals 231. Although recording intervals 231 may be shown as seven discrete measurements in FIGS. 2A-2C, it is to be understood that recording intervals 231 may be as small as possible. For example, a capacitance meter (see, e.g., FIG. 9) may be used to measure a large number of samples per second (e.g., 100 samples per second) as fluid may be continuously supplied at any suitable rate into container 210. Those skilled in the art will also appreciate that while FIGS. 2A-2C may essentially show variations in two dimensions that may produce similar volume measurements as a function of fluid height, variation may take place among all three dimensions of DUTs 220-222, and an infinite number of shapes can potentially create similar measurement profiles.

To improve the uniqueness of a data set for a given DUT, additional measurement angles may be used. For example, as shown in FIGS. 3A-3C, respective DUTs 220-222 may be rotated by a rotation angle R (e.g., 45 degrees) with respect to an axis of container 210 (e.g., an axis running perpendicularly through the drawing sheet of FIGS. 3A-3C) in order to collect a displacement profile for a different orientation of DUTs 220-222 with respect to container 210. In FIGS. 3A-3C, a single rotation angle R is shown, but those skilled in the art will appreciate that any number of suitable rotation angles may be used to collect additional displacement profiles for DUTs 220-222. Additionally, an increased number of measurement intervals per angle (e.g., number of recording intervals 232) may be used when recording a displacement profile for a given DUT. It is to be understood that any number of recording intervals may be used in accordance with the invention.

In order to support DUTs 220-222 for an arbitrary number of rotation angles, a support (not shown) may be included as part of container 210 to suspend and/or accurately rotate the DUT within container 210. In some embodiments, DUTs 220-222 may be fixed within container 210 and container 210 may be rotated to provide an arbitrary number of rotation angles. For example, as shown in FIG. 19, measuring system 1900 may include container 1910, which may be spherical in shape. A DUT (not shown) may be fixed within container 1910 at a specific orientation with respect to container 1910 (e.g., by a harness spanning across a hollow portion of spherical container 1910). Container 1910 may then be rotated to and held in any arbitrary orientation by actuators 1990. When container 1910 is in any suitable orientation, fluid may be dispensed from reservoir tank 1960 into container 1910.

Figure 14:
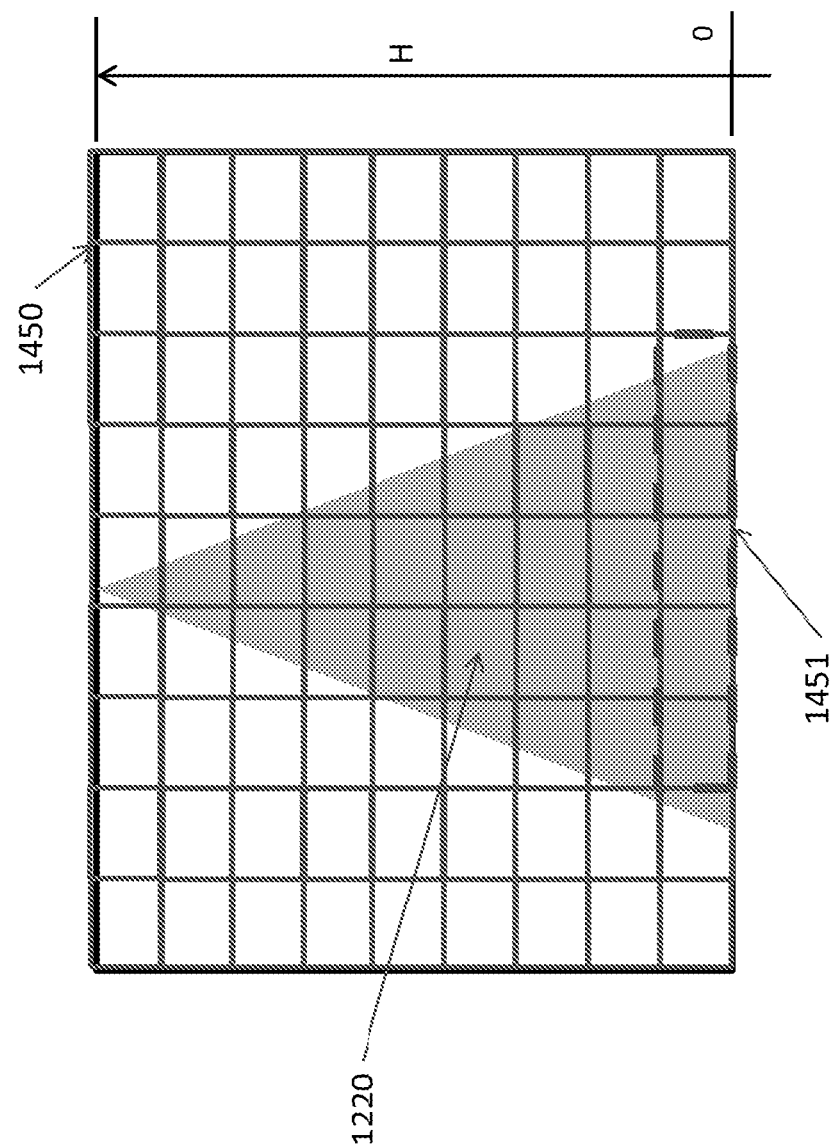
FIG. 14 shows an illustrative depiction of a pixel grid used in accordance with some embodiments of the invention.

To translate from fluid displacement as a function of fluid height (e.g., the representation shown in FIG. 13C) to a more useful representation (e.g., a pixel grid), a translation process may be performed. For example, as shown in FIG. 14, pixel grid 1450 may be laid over a representation of the shape of DUT 1220 from FIG. 12. As seen from FIG. 13C, the fluid displacement of DUT 1220 may be known as a function of fluid height. The fluid displacement of DUT 1220 over a given range of measured fluid heights may directly correspond to the number of the pixels that may contain mass within a certain row of pixel grid 1450. In this manner, each pixel of pixel grid 1450 may be solved to determine whether or not matter is present within each pixel (e.g., a linear model similar to linear model 501 shown in FIG. 5 may be used to solve each pixel). For example, as shown in FIG. 13C, measurements represented by trace 1304 may be translated into pixel grid 1450. The result may be a pixelated version of DUT 1220 (e.g., a bottom portion of DUT 1220 may be represented by pixels 1451 of pixel grid 1450). Translating data from FIG. 13C to pixel grid 1450 of FIG. 14 may be accomplished using a model. One potential model that may be used is described in further detail below with respect to FIGS. 4A-5.

Figure 4B:
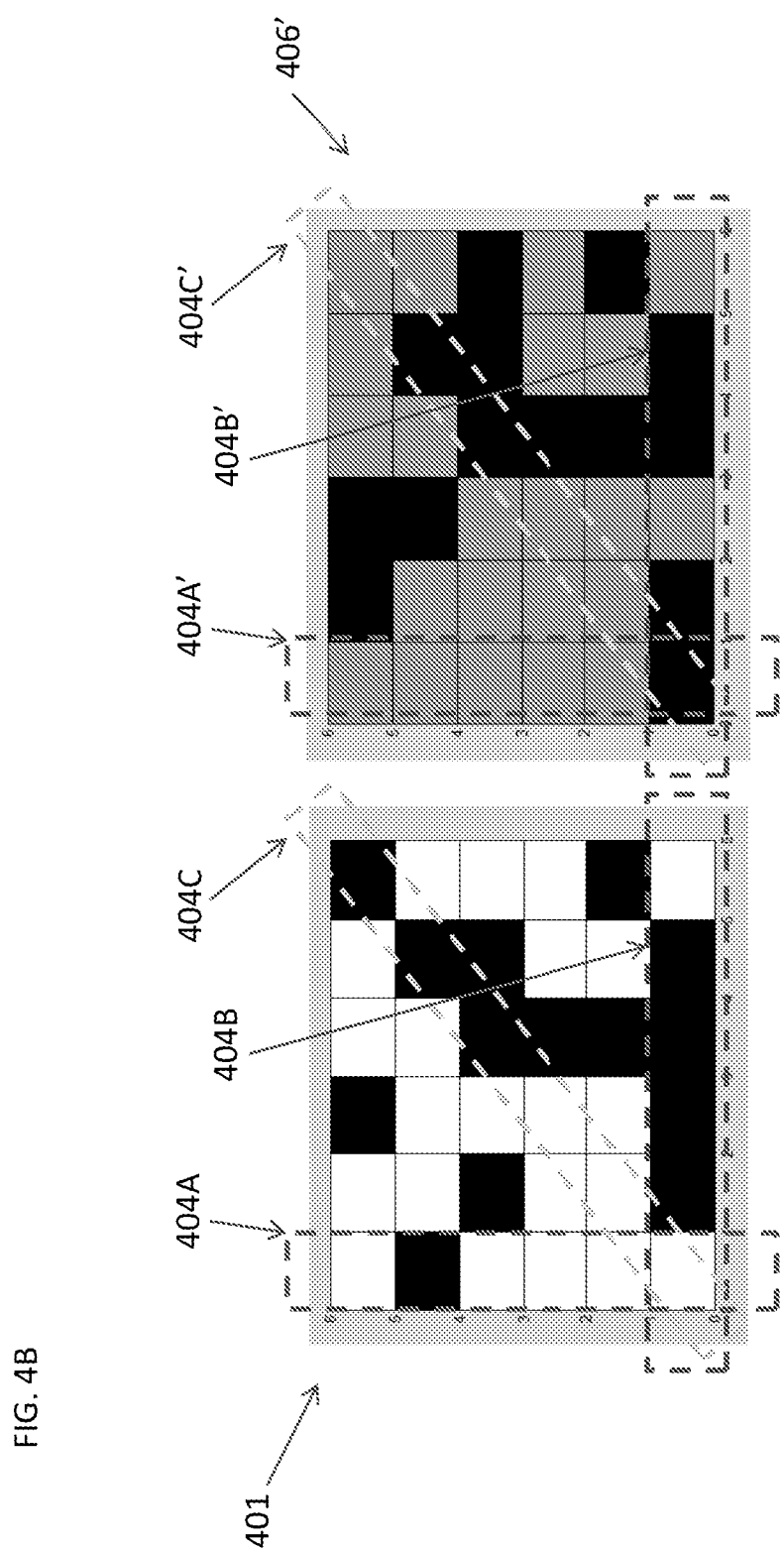
Figure 4C:
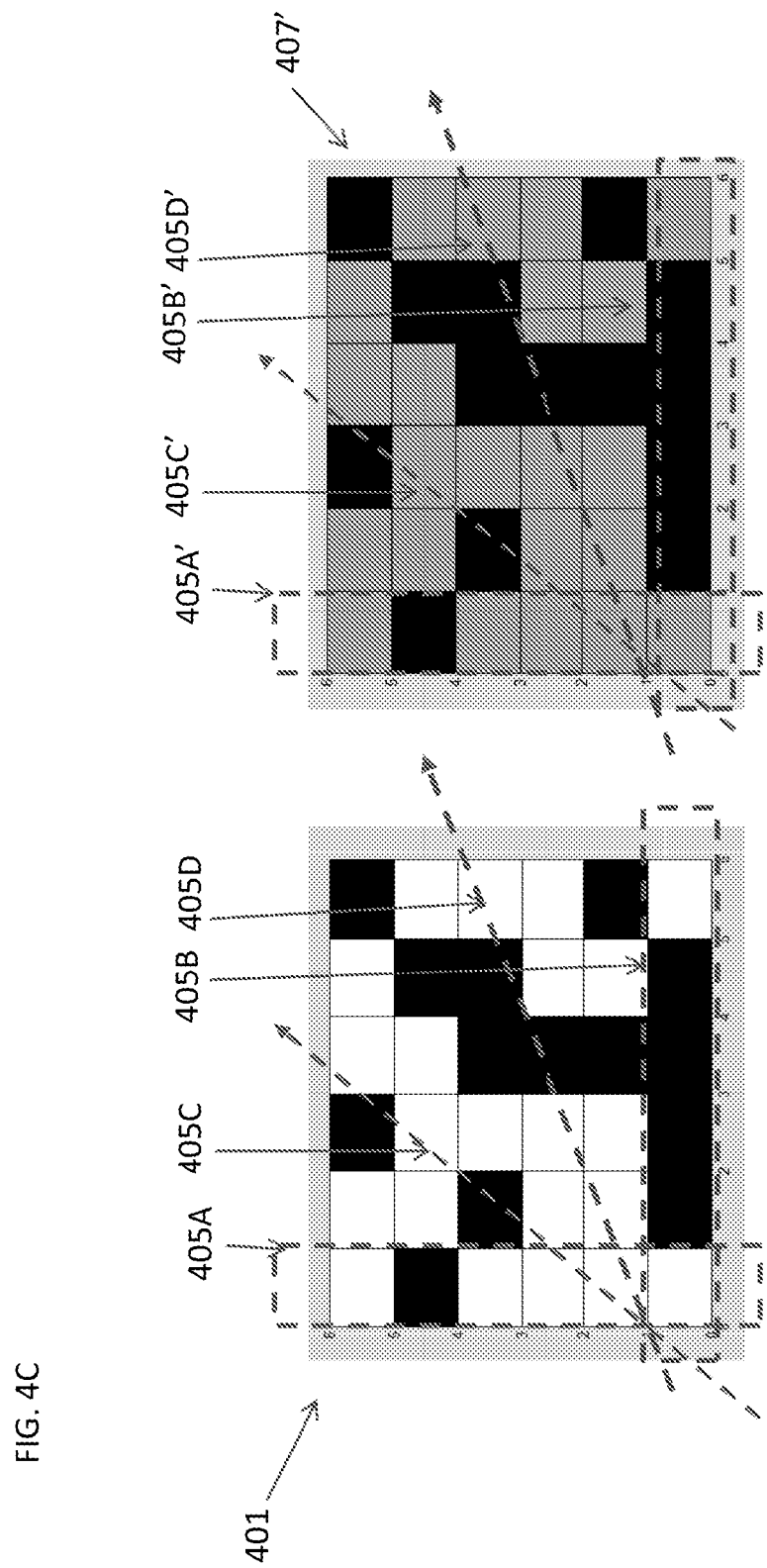

As those skilled in the art will appreciate, the number of angles a given DUT may need to be measured at in order to accurately reconstruct the 3D shape of the DUT may vary depending on the shape of the DUT. FIGS. 4A-4C show a two-dimensional example of an illustrative original mass pattern along with a reconstructed version of the original mass pattern (e.g., each reconstructed pattern may be created using a different number of measurement angles in each of FIGS. 4A-4C) using techniques in accordance with the invention (e.g., FIGS. 4A-4C may be created using a similar technique as disclosed with respect to FIG. 14). Although a two-dimensional example is disclosed with respect to FIGS. 4A-4C, those skilled in the art will appreciate that the disclosed techniques may be extended to three dimensions. Original mass pattern 401 of FIG. 4A may depict a simplified two-dimensional representation of an arbitrary DUT. As shown in pattern 401, the DUT can be approximated by a grid of pixels, and each pixel may have a value of either one (i.e., mass belonging to the DUT is present) or zero (i.e., mass belonging to the DUT is not present). In FIG. 4A, pixels that are filled may correspond to a lack of mass while pixels that are not filled may correspond to mass of the DUT. Although only 36 pixels are shown in pattern 401, it is to be understood that a pattern may contain any suitable number of pixels for attempting to accurately represent a given mass pattern. Reconstructed pattern 401' of FIG. 4A shows a reconstructed version of pattern 401 using techniques (e.g., techniques similar to those detailed with respect to FIG. 14) in accordance with the invention. To arrive at reconstructed pattern 401', measurements of the DUT may be performed at two angles (e.g., 0 degrees and 90 degrees with respect to a given reference) using a process similar to the process outlined with respect to FIGS. 2A-3C and 12-13C. Fluid height measurements may be used to determine the fluid displacement of the DUT as a function of fluid height, giving horizontal sums and vertical sums (e.g., sums in each column 402 and each row 403 of pattern 401 shown in FIG. 4A).

A model may be used to process the measurements of the DUT and provide the reconstruction seen in pattern 401'. For example, the measurements of the DUT may be used to populate a linear model (e.g., linear model 501 of FIG. 5) in the form of the following formula (3):

$$[A]*x=b$$

Figure 5:
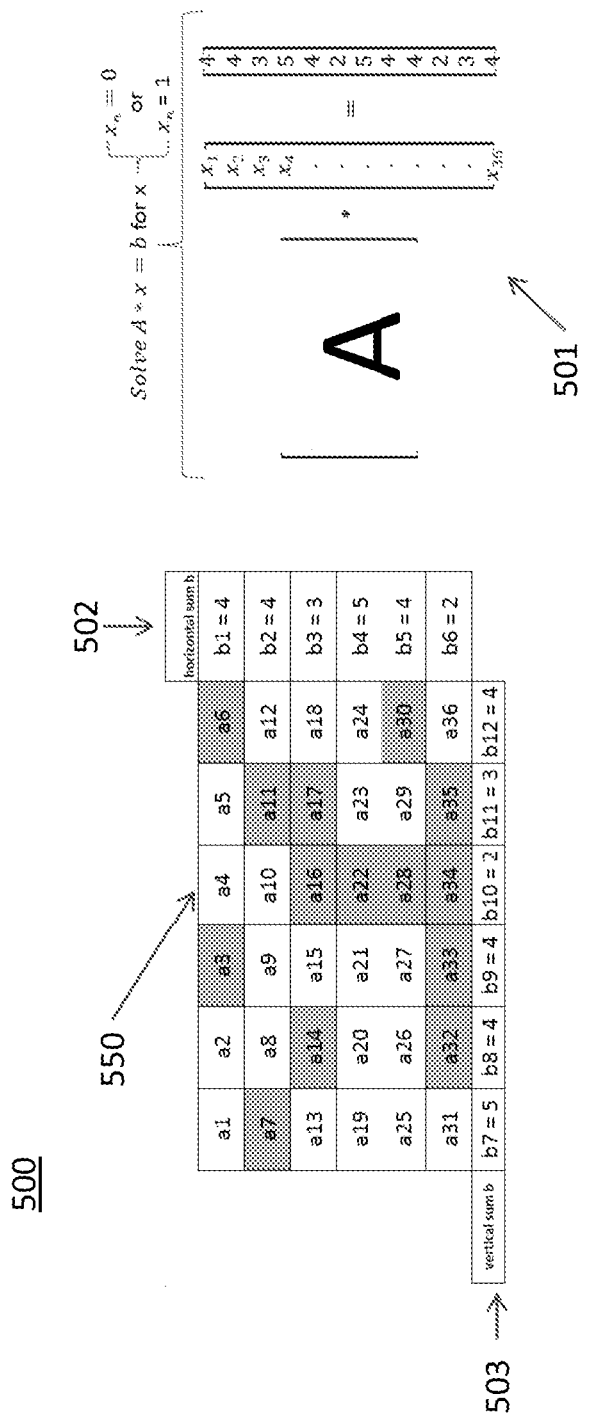
FIG. 5 shows an exemplary linear model that may be used to find the reconstructed two-dimensional mass pattern of FIG. 4A in accordance with some embodiments of the invention.
Figure 24:
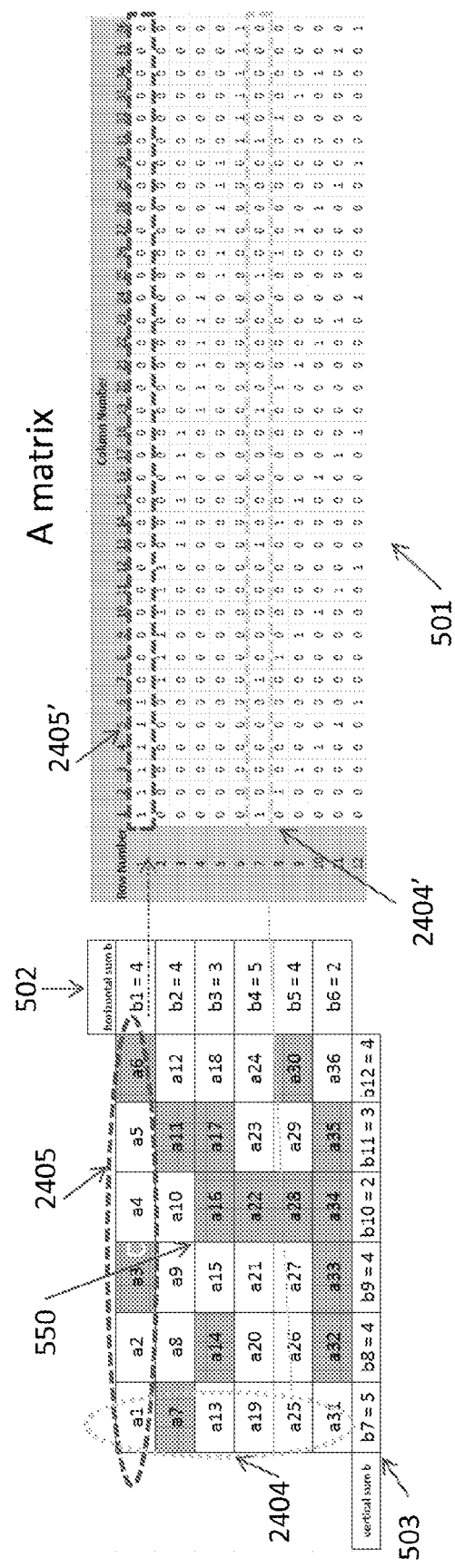
FIG. 24 shows an exemplary linear model that may be used to find the reconstructed two-dimensional mass pattern of FIG. 4A in accordance with some embodiments of the invention.

Pixel grid 550 is shown in FIG. 5 to aid visualization with respect to populating the model represented by formula (3). The selection of the number of pixels to include in pixel grid 550 may be based on any suitable factors (e.g., the number of pixels needed to attempt to accurately represent original mass pattern 401 of FIG. 4A). Additionally, the dimensions of pixel grid 550 may also be chosen based on any suitable factors (e.g., pixel grid 550 may have any suitable dimensions needed to attempt to accurately represent original mass pattern 401 of FIG. 4A). A user may decide original mass pattern 401 is accurately represented when pixel grid 550 adequately reflects the shape and geometry of original mass pattern 401. Pixels within pixel grid 550 may be assigned arbitrary names (e.g., a1 through a36 in FIG. 5) in order to keep track of the pixels. Also shown in FIG. 5, each column 503 and each row 502 may contain the results of measurements performed on original mass pattern 401 (e.g., measurements performed using a similar process as described with respect to FIGS. 2A-3C and 12-13C) at two angles of measurement (e.g., each column 503 may correspond to 6 measurements taken at a first angle while each row 502 may correspond to 6 measurements taken at a second angle). Element x of formula (3) may represent the presence or absence of matter inside the pixel variables. Element x may be what is solved for. Element b of formula (3) may contain the volumetric fluid displacement of a relevant displacement slice of a DUT (e.g., element b may be equal to the number of pixels/voxels that contain mass at a given fluid height within the grid, for example, the measurement shown in FIG. 13C). Element A of formula (3) may be a transformation matrix (e.g., an n by 36 matrix in FIG. 5, where n may be the number of rows of element A, which may correspond to the number of angles used for taking measurements) that may identify pixel variables contained within the relevant displacement slice (i.e., element A may identify which pixels are located within a given relevant displacement slice that may correspond to the sum found in element b). Note that the number of columns of element A may correspond to the total number of pixels while the number of rows of element A may correspond to the number of angles used for measurement. It is understood that the arrangement presented for element A is merely a convention and A may take other suitable forms (e.g., the number of rows of element A may correspond to the total number of pixels while the number of columns of element A may correspond to the number of angles of measurement). A displacement slice as defined herein may be the volumetric fluid displacement of the DUT at a given height of the DUT. The details of the linear model for the illustrative example depicted by pattern 401 can be seen in FIG. 5. Solving linear model 501 using measurements of the DUT as shown in FIG. 5 may result in reconstructed pattern 401' of FIG. 4A. As shown in FIG. 4A, although a satisfactory solution of model 501 may be found (e.g., an element x may be found that satisfies model 501), reconstructed pattern 401' may not match original pattern 401. For example, the sum of pixels indicating mass from the DUT present in column 402' of pattern 401' may equal the corresponding sum in column 402 of pattern 401 (e.g., both may show the presence of four pixels indicating mass). However, the placement of pixels indicating mass present in column 402' amongst the rows 403' of pattern 401' may not match the corresponding placement of pixels indicating mass present in column 402 amongst the rows 403 of pattern 401. Thus, in the case of pattern 401, measurements performed at two angles may not be sufficient to accurately reconstruct pattern 401 (e.g., the sums of the horizontal and vertical displacements may not be enough to provide a fully accurate reconstruction of original pattern 401). Taking sets of measurements at additional measurement angles may improve the accuracy of a reconstructed pattern. For example, FIGS. 4B and 4C may show reconstructed patterns (e.g., reconstructed patterns 406' and 407') of original mass pattern 401 using a different number of measurement angles (e.g., three measurement angles 404A-404C of pattern 401 and angles 404A'-404C' of pattern 406' of FIG. 4B or four measurement angles 405A-405D of pattern 401 and angles 405A'-405D' of pattern 407' of FIG. 4O). In FIG. 4B, three measurement angles 404A-404C may be used to gather data for creating reconstructed pattern 406'. As shown in FIG. 4B, three measurement angles may not provide enough data to accurately reconstruct original mass pattern 401 with pattern 406'. In FIG. 4C, four measurement angles may be used to gather data for creating reconstructed pattern 407'. As shown in FIG. 4C, four measurement angles 405A'-405D' may provide enough information to accurately reconstruct pattern 401 with pattern 407'. Those skilled in the art will appreciate that any number of suitable measurement angles may be used in order to gather adequate data to reconstruct the shape of a given DUT. As measurement angles are added and displacement profiles are measured for each measurement angle, a liner model may be adjusted (e.g., rows may be added to element A of linear model 501) to account for the additional measurement angles. It is also understood that while specific angles 404A-405D' are shown in FIGS. 4B and 4C, any suitable angles may be used (i.e., there are no restrictions on the number of and relationship between measurement angles). Measurement angles may be selected based on any suitable criteria, for example, measurement angles may be selected based on the information they may provide. FIG. 24 may further illustrate how population of linear model 501 may be performed for the example discussed with respect to FIG. 4A. For example, a measurement performed at a particular height of a DUT and at a particular orientation of the DUT may intersect pixels a1-a6 as indicated by row 2405. Thus row 2405' of element A may be populated as shown in FIG. 24 to indicate which part of the DUT may have been measured (i.e., which pixels of pixel grid 550 may have been intercepted). For a different height of the DUT and a different orientation of the DUT, a measurement may intersect pixels a1, a7, a13, a19, a25, and a31 as indicated by column 2404. Thus row 2404' of element A may be populated as shown in FIG. 24 to indicate which part of the DUT may have been measured (i.e., which pixels of pixel grid 550 may have been intercepted).

Figure 6:
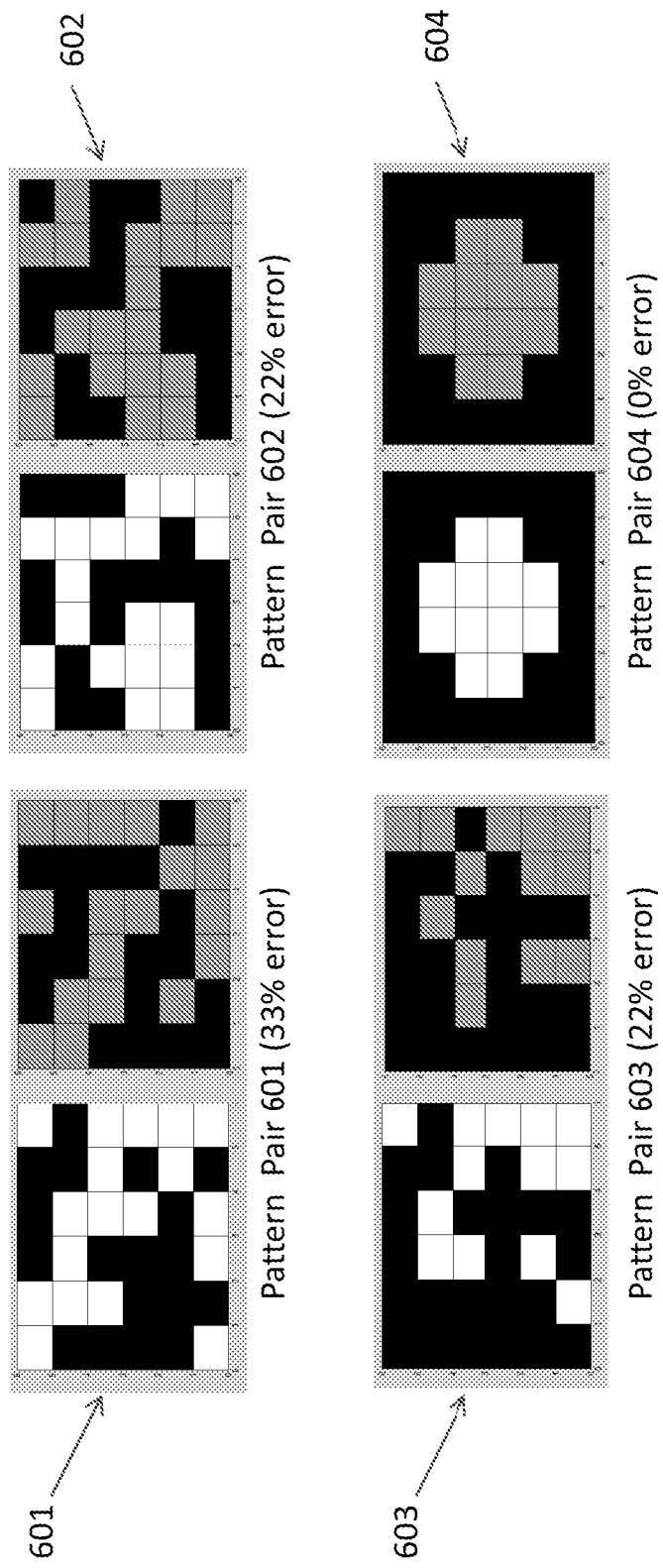
FIG. 6 shows original and reconstructed pattern pairs for four exemplary patterns in accordance with some embodiments of the invention.

As shown in FIG. 5, model 501 may contain 36 unknowns (e.g., pixel variables represented by element x) and only 12 displacement equations (e.g., 6 horizontal equations and 6 vertical equations). Those skilled in the art will appreciate that although there may not be enough equations to provide a full solution (i.e., a reconstructed pattern that fully matches the original pattern) for all cases, the degree of pattern matching accuracy may be highly dependent upon the original pattern shape and the number of angles used during the measurement process. To illustrate this point, FIG. 6 shows original and reconstructed pattern pairs 601-604 for four exemplary patterns. Reconstruction accuracy may not be 100% accurate for an arbitrary pattern (e.g., only pattern pair 604 may be 100% accurate in FIG. 6). Those skilled in the art will appreciate that the degree in reconstruction error rate may be proportional to the sparseness of the original pattern. For example, cases where at least one displacement measurement eliminates the uncertainty of the existence of matter within an entire slice (e.g., the left-most columns of pattern pairs 603 and 604) may illustrate this point. In pattern pair 603 there may be one vertical column (i.e., the far left column of pattern pair 603) where a displacement sum is zero. In this case, it may be known that all pixels in the vertical column must not contain matter (e.g., a "column cancellation"). The result may be a lower error rate in the reconstructed pattern of pattern pair 603 due to an effectively reduced ratio of unknowns to equations as compared to a case were no column cancellations exist (e.g., pattern pair 601). In some cases, multiple column or row cancellations may be possible (e.g., pattern pair 604). As shown in pattern pair 604, two column cancellations (i.e., the left most and the right most columns) and two row cancellations (i.e., the top and bottom rows) may eliminate the uncertainty of the existence of matter in 20 pixels. The result may be a reconstruction that matches the original pattern exactly.

Now that the foundation for the idea of volume sum reconstruction has been established, extension of the concepts into three dimensions can begin. Similar to the 2-dimensional case, a linear model with a form similar to linear model 501 may be used. However, an unknown in the A matrix may represent a voxel (e.g., a 3-dimensional, cubical version of a pixel). As a result, a straight volumetric "slice" through a grid of voxels may involve only a partial volume intercept of the voxel. The solution to the matrix equation (A*x=b), in practice, and even computationally, may result in a value for x that may not be limited to a value of zero or one. There are several reasons for this. First, any solver routines used to solve the linear model may try to best optimize the solution within a limited computational budget. Second, the reconstruction accuracy may not be 100% for all patterns. Several angles of fluid immersion may be used, and each different "look" to the object, given the many permutations of angles which could be used to generate a solution to x, may try to best satisfy each visual perspective. Certain angles are superior for imaging certain regions of a given DUT, based on reasons similar to the 2-dimensional case (e.g., absence of mass within a certain slice at a specific angle of the capture of information with respect to the container holding a DUT with a fixed position in the container can reduce the number of unknowns), and the resulting solution for x may attempt to satisfy all angles of measurement. Finally, a solver routine may have no motivation to provide physically accurate solutions. For example, the solver routine may decide to include floating mass particles, such as dust suspended in the air, to satisfy a displacement sum. Thus, it may be necessary to relax the constraints on the solution for x. In the 2-dimensional case, the solution to x may be constrained to be quantized (e.g., 0 or 1), but the solution may now be relaxed (e.g., from −0.5 to 1.5). After finding a solution, a solver routine may assign a lower and upper threshold (e.g., based upon a statistical engine) to determine whether a voxel contains mass.

Figure 7:
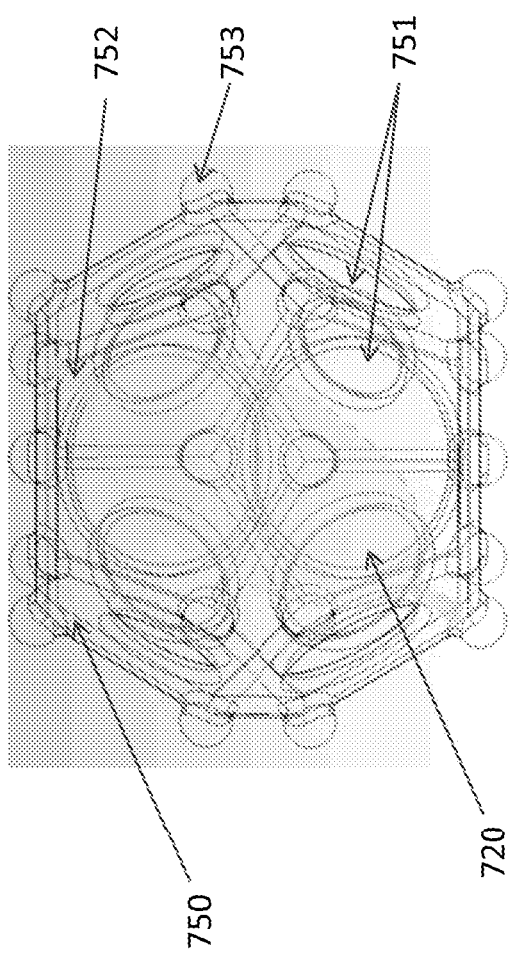
FIG. 7 shows an illustrative immersion cage in accordance with some embodiments of the invention.
Figure 8:
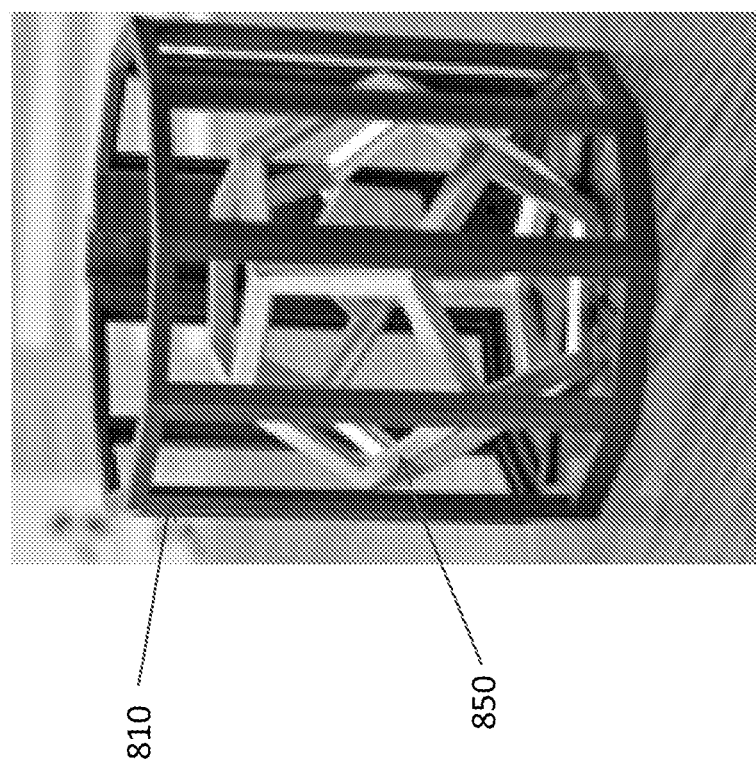
FIG. 8 shows an illustrative immersion cage within an illustrative container in accordance with some embodiments of the invention.
Figure 9:
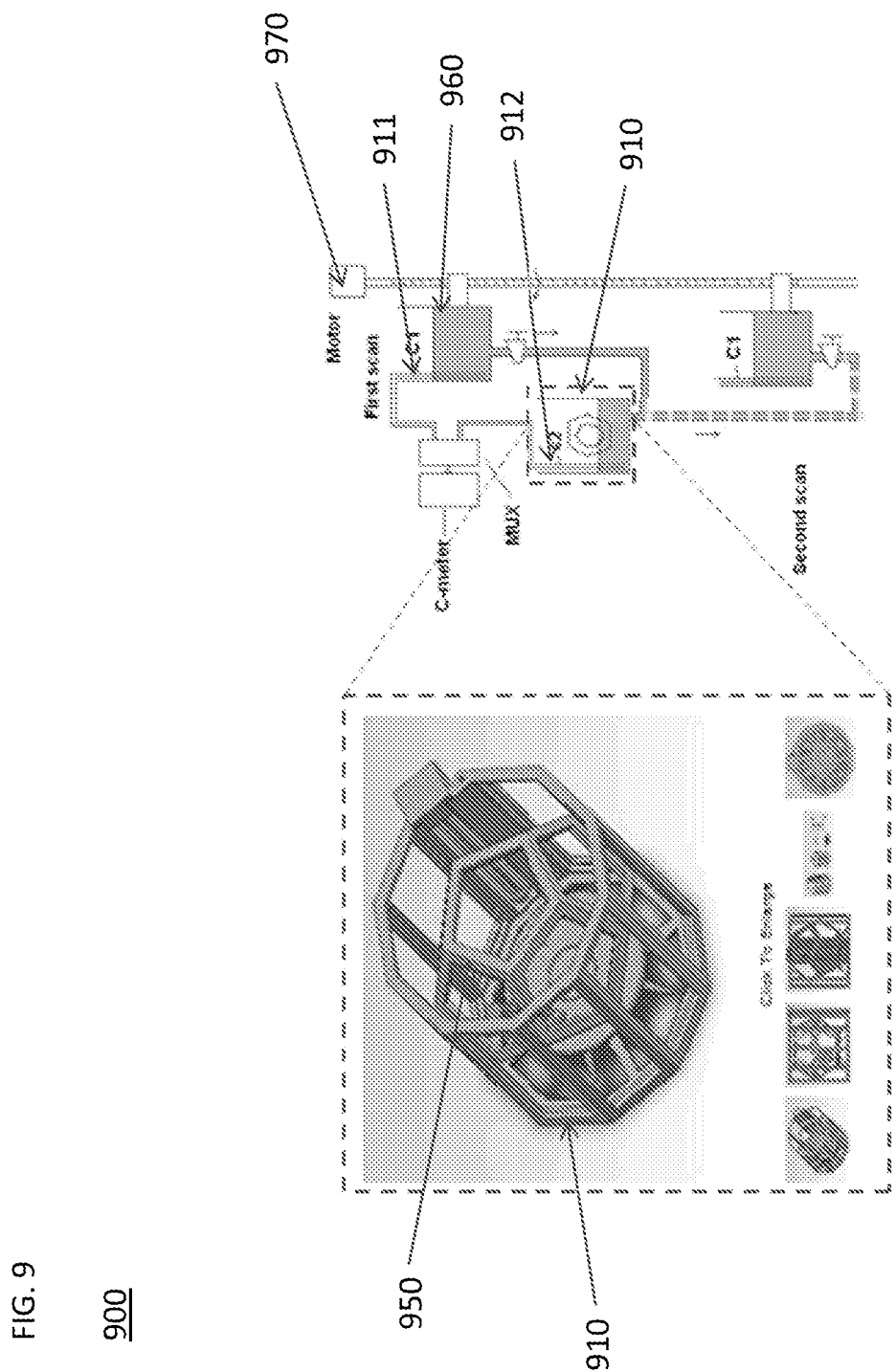
FIG. 9 shows an illustrative 3D fluid scanning system in accordance with some embodiments of the invention.
Figure 10:
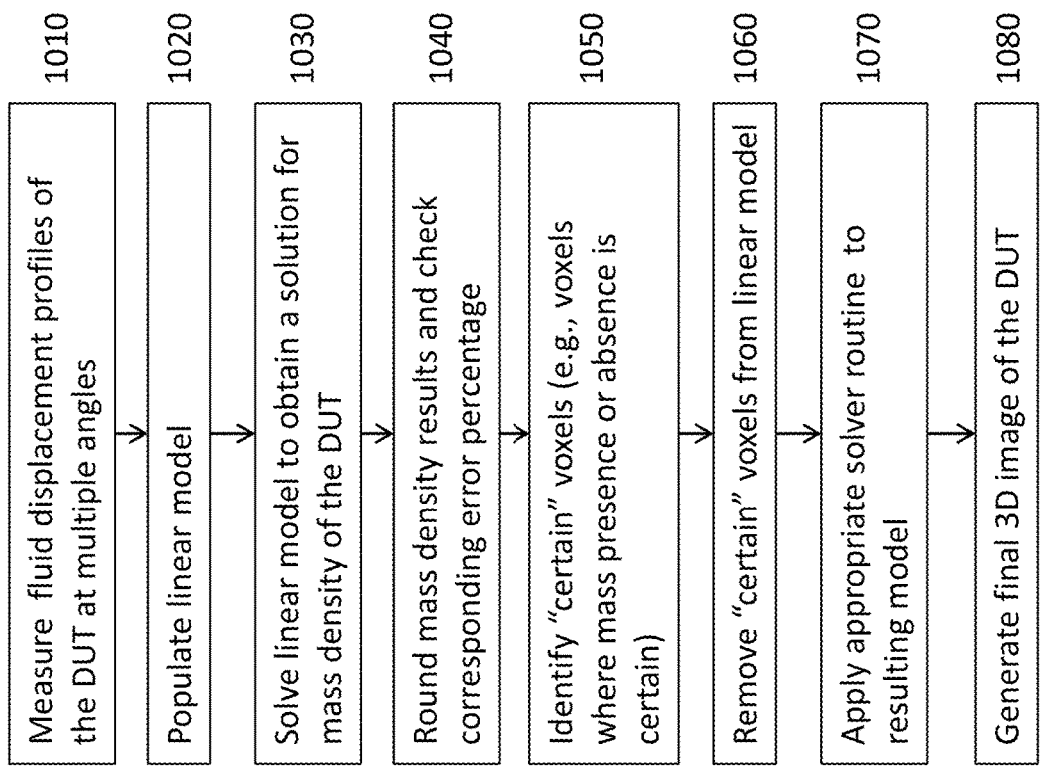
FIG. 10 shows a flowchart of an illustrative process for generating a 3D image of a device under test ("DUT") from fluid displacement measurements in accordance with some embodiments of the invention.

FIG. 10 shows a flowchart for an illustrative process 1000 for creating a three-dimensional rendering of a DUT in accordance with some embodiments. It is to be understood that the steps shown in process 1000 of FIG. 10 are merely illustrative and that existing steps may be modified or omitted, additional steps may be added, and the order of certain steps may be altered. In step 1010, fluid displacement profiles for a DUT may be measured for multiple orientations of the DUT with respect to a container (e.g., similar to the processes outlined with respect to FIGS. 1-3C and 12-13C). It is understood that an immersion cage (e.g., as shown in FIGS. 7-9) may or may not be used to support the DUT. In step 1020, data from the fluid displacement profiles for the DUT may be used to populate a linear model (e.g., a linear model similar to linear model 501). In step 1030, the linear model may be solved to obtain a solution for the mass density of the DUT. To solve the linear model, any suitable solution method may be used (e.g., by hand or using a solver routine on a computer). In step 1040, the solution for the mass density of the DUT may be rounded and the corresponding error percentage may be checked. In step 1050, "certain" voxels may be identified in the linear model. As used herein, "certain" voxels may represent voxels where mass presence or absence may have a high probability of being certain, (e.g., based upon the amount exceeding the threshold). In step 1060, "certain" voxels may be removed from the linear model. In step 1070, an appropriate solver routine may be applied to the linear model resulting from step 1060 to obtain an updated model. In step 1080, a 3D image of the DUT may be generated from the model after the solver routine has been applied thereto.

To reconstruct a DUT with a complicated 3D shape, multiple angles of measurement may be required to discern the full 3D shape of the DUT. As a result, an immersion cage may be needed to hold and support the DUT in various angles of measurement within a container. For example, FIG. 7 shows an illustrative immersion cage 750 with a DUT 720. Immersion cage 750 may include apertures 751, DUT supports 752, and buttresses 753. Apertures 751 may allow fluid entrance and fluid settling into the interior of immersion cage 750. Apertures 751 may also provide a visual aid when determining the fluid level, much like tick marks on a ruler. In some embodiments, (e.g., FIG. 9) multiple apertures 751 may not be needed for visual aid because capacitance probes may measure the fluid level, and immersion cage 750 may instead have only a single aperture to allow fluid entry into immersion cage 750. Supports 752 may be any suitable mechanism (e.g., a pole) that can be placed between two vertices of cage 750 to suspend DUT 720 within immersion cage 750. For example, supports 752 may consist of a magnetic plate which can be used to connect to DUT 720. Buttresses 753 may maintain a gap between the bottom of immersion cage 750 and a container that immersion cage 750 may be placed within. Buttresses 753 may also provide a smaller contact area between the tank and the cage, improving repeatability of measurement (e.g., a larger contact area may allow for debris that enters the container to cause a shift in the distance of DUT 720 with respect to the bottom of the container). Immersion cage 750 may be any suitable shape including, but not limited to, cubic, hexahedral, dodecahedral, icosahedral, or combinations thereof. Immersion cage 750 may have any suitable volume. For example, the volume of immersion cage 750 may be selected based upon the size of DUT 720. Immersion cage 750 may be made of any suitable material, including, but not limited to, metal, plastic, ceramic, or combinations thereof.

FIG. 8 shows an immersion cage 850, which may be similar to cage 750 of FIG. 7 (e.g., shaped as a dodecahedron) within a container 810 in accordance with some embodiments of the invention. Container 810 may be any suitable shape (e.g., a 10-sided cylinder). Container 810 may be chosen based on any suitable factors, including, but not limited to, the shape of immersion cage 850. For example, the choice of the shape of container 810 may allow for a smaller container volume relative to the size of immersion cage 850, increasing the fluid height change for a given DUT size. The larger the fluid height change for a given DUT size, the greater the measurement sensitivity may be to reduce the effect of any error in the fluid level measurement.

Figure 15:
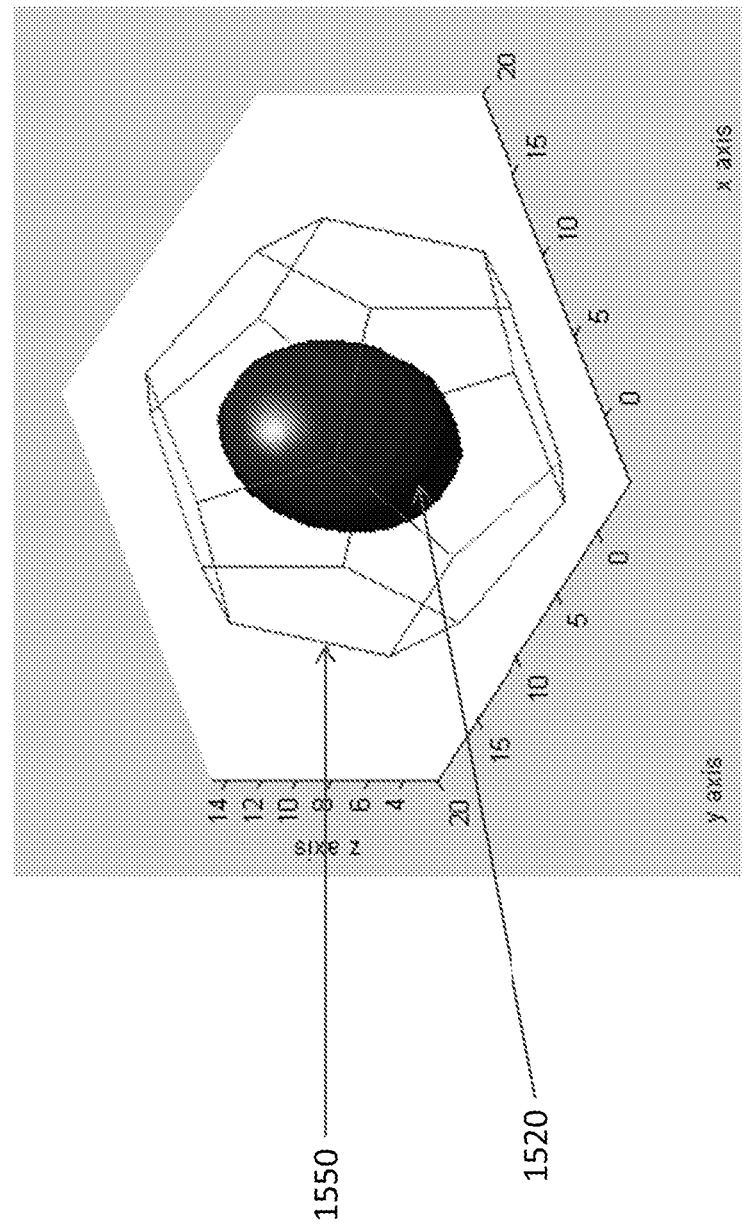
FIG. 15 shows an illustrative immersion cage and DUT used in accordance with some embodiments of the invention.
Figure 16A:
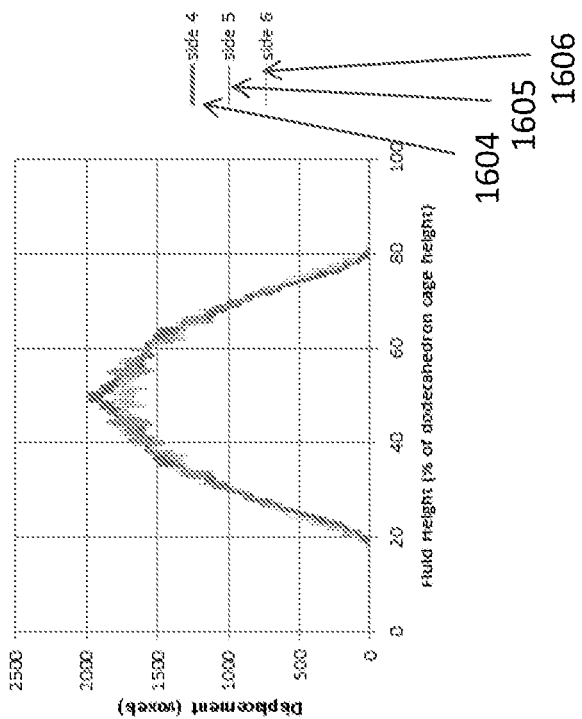
FIGS. 16A and 16B show illustrative depictions of measurement techniques used in accordance with some embodiments of the invention.
Figure 16B:
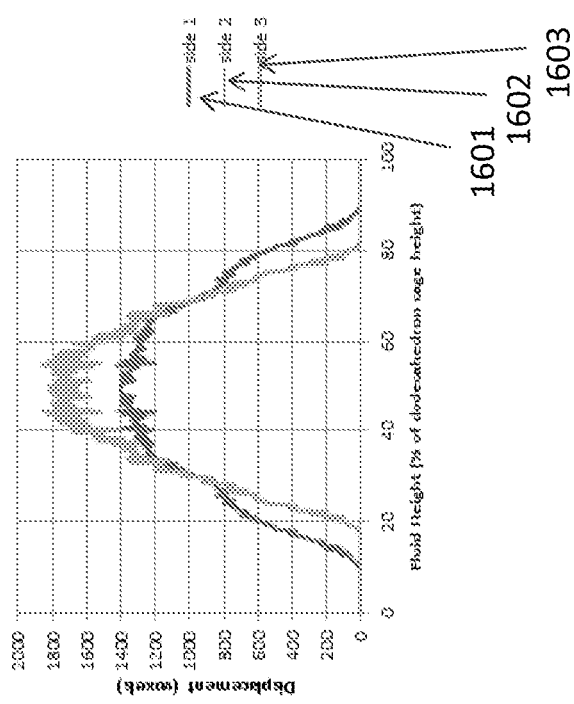
Figure 17B:
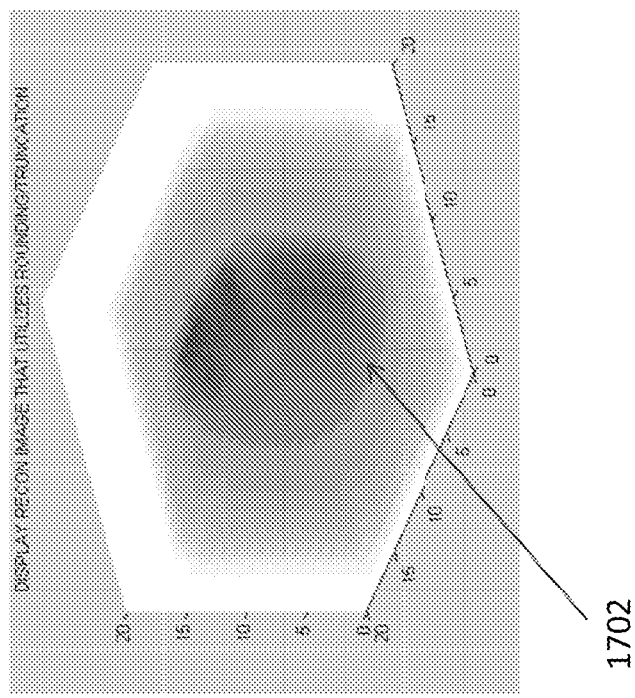
FIGS. 17A and 17B show illustrative depictions of modeling techniques used in accordance with some embodiments of the invention.
Figure 17A:
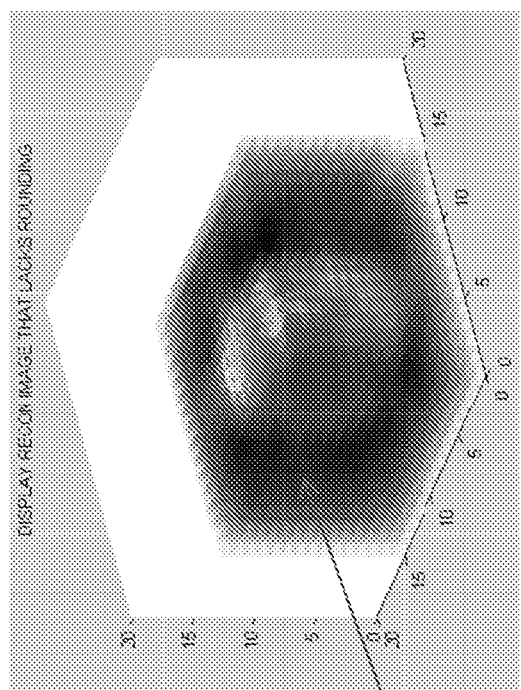
Figure 18B:
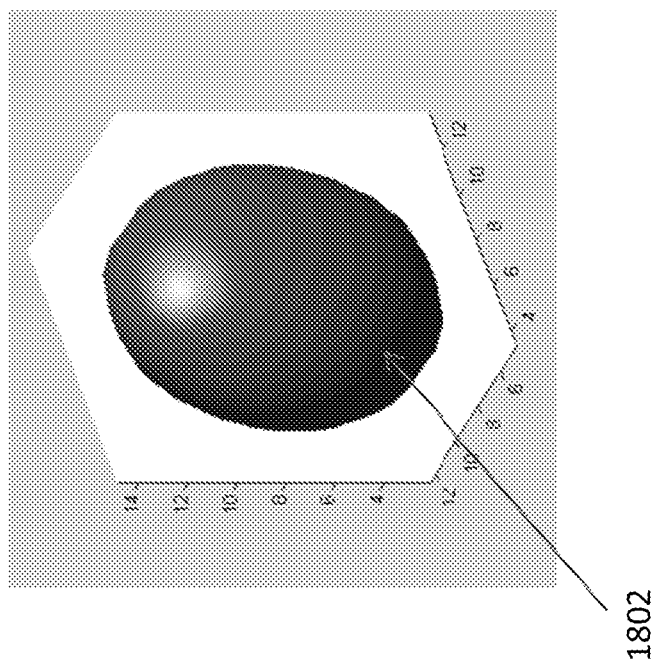
FIGS. 18A and 18B show illustrative depictions of modeling techniques used in accordance with some embodiments of the invention.
Figure 18A:
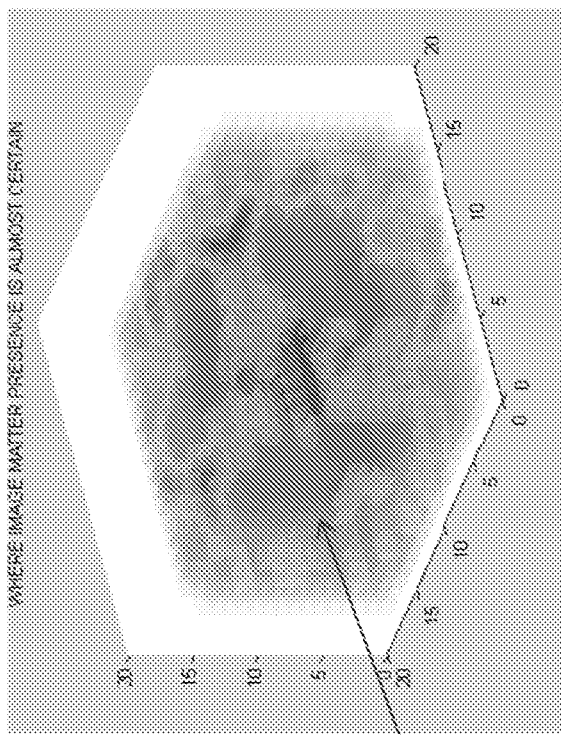

FIG. 9 shows an illustrative 3D fluid scanning system 900 in accordance with some embodiments of the invention. Immersion cage 950, which may be similar to cages 750 and/or 850, may be placed into a container 910, which may be similar to container 810. The DUT to be measured (not shown) may be suspended or otherwise fixed within and with respect to cage 950, and the displacement of the DUT may be measured as the container 910 is filled with fluid. Fluid may be supplied from a reservoir tank 960 into container 910. The fluid level in container 910 may be measured by a first component (e.g., through a capacitive probe 912) that may be contained within or adjacent to container 910, and the fluid supplied from reservoir tank 960 may be measured by a second component (e.g., through a second capacitive probe 911) that may be contained within or adjacent to reservoir tank 960. Fluid level measurements may be performed at any suitable interval. For example, a user may select a number of measurements that correlates to a parameter of a model that the user may utilize to represent the DUT. Many other methods can be used to measure fluid height, including, but not limited to, cameras and microwave horn antennas. By knowing the difference in fluid level in container 910 versus the fluid that is supplied from reservoir tank 960, the displacement of the DUT as a function of fluid height may be found. The fluid level measurements can be processed using techniques similar to those described with respect to FIGS. 12-13C in order to obtain displacement profiles for the DUT. In this implementation, the speed of the fluid supply may be dictated by the difference in the relative heights of reservoir tank 960 and container 910. The relative heights of reservoir tank 960 and container 910 can be controlled by a motion control stage 970. Motion control stage 970 may be a motor, and may only control the height of reservoir tank 960 relative to container 910. Container 910 may stay at a constant level and the height of reservoir tank 960 may be varied. Motion control stage 970 may dynamically control the speed with which container 910 is filled. Additionally, motion control stage 970 may be able to reverse the flow of fluid out of container 910 by making the reservoir tank 960 lower in height relative to container 910. Furthermore, measurements can be made when container 910 is emptying as well as when container 910 is filling. Moreover, the arrangement shown in FIG. 9 may allow a very large supply tube to inject fluid from underneath the DUT, which may minimize the turbulence of the fluid entering the tank and increase signal to noise ratio. The fluid immersion process may be repeated for multiple angles of measurement. In some embodiments, for example, six unique angles of measurement may be used for a 12-sided dodecahedron immersion cage 950. By rotating a dodecahedron-shaped cage 950 such that each of six particular sides may rest on the bottom of container 910, measurements may be made of fluid level versus fluid supplied for each of six unique angles of cage 910. This data may be used to create displacement profiles as a function of fluid height (e.g., as disclosed with respect to FIGS. 12-13C). The displacement profiles may be created for each of the six unique angles of the DUT within the container enabled by the cage. A motivation for measuring at each unique angle may be to provide a model with enough equations relative to the number of unknowns in order to create an accurate reconstruction. From the displacement data, 3D image reconstruction may be performed. For example, a simulated reconstruction in accordance with some embodiments is shown in FIGS. 15-18B. As shown in FIG. 15, ellipse 1520 may be contained within dodecahedron cage 1550. Dodecahedron cage 1550 may allow a user to place cage 1550 within a measurement container and record fluid displacement as a function of fluid height. Dodecahedron cage 1550 may have 12 faces that may correspond to 6 unique angles of measurement (e.g., opposing faces of the dodecahedron may give redundant data). Dodecahedron cage 1550 may be placed on one face within the container and a displacement profile may be recorded. Dodecahedron cage 1550 may be rotated onto a second face and a displacement profile may once again be measured. This process may be repeated until displacement profiles are measured for all 6 unique faces. FIGS. 16A and 16B show an example displacement profile (e.g., traces 1601-1606) for each of the 6 unique angles of measurement from FIG. 15 (e.g., for ellipse 1520 that may be centered symmetrically within dodecahedron cage 1550, for example, using the center of mass or geometry of ellipse 1520). After solving a linear model (e.g., A*x=b of formula (3)), an image which can represent the non-porous density or probability of mass within each voxel may result, for example, as shown in image 1701 of FIG. 17A. Image 1701 may not have a direct physical interpretation. Image 1701 may instead represent the "desire for convergence to a solution" of a solver routine to have mass within a given region in order to best satisfy the constraints from the linear model. To convert image 1701 into a physical solution, assumptions may be made about the DUT. For example, if the DUT is non-porous, then it may straightforward to assign an upper and lower threshold cutoff and round a given voxel to either a 1 or a 0 (e.g., either the voxel is non-porous or it is air). A rounded version of image 1701 is shown in image 1702 FIG. 17B. Those skilled in the art will appreciate that the solution to the linear model need not assign voxels to be either a 0 (air) and a 1 (non-porous). For example, for a porous material (e.g., 50% porous) the solution for element x of formula (3) can be 0.5. By examining the probability/density image with statistical methods, upper and lower thresholds for different density regions can also be automatically chosen. A limited number of well-defined densities within the region may result in the best solution. Once constraints on element x of formula (3) are set, a solver routine may be fairly robust at optimizing the solution under those constraints. After assigning an upper and lower threshold cutoff for the rounding of a given voxel, voxels that greatly exceed the thresholds may have a high probability to have the proper solution (e.g., as may be shown in image 1801 of FIG. 18A). The variables with a high probability of proper solution may be removed from the matrix, and a 2nd iteration may be performed (e.g., as shown in image 1802 of FIG. 18B). After reconstructing the actual 3D shape, conventional software (e.g., MATLAB by MathWorks) may be used to convert between a 3-dimensional voxel space and polygonal surface information (e.g., Standard Tessellation Language ("STL") format), which may be utilized by 3D printers and 3D display technology. STL format may be a file format native to the stereolithography computer-aided design ("CAD") software created by 3D systems. This file format may be supported by many other software packages. STL format is widely used for rapid prototyping and computer-aided manufacturing. STL files may describe only the surface geometry of a three dimensional object without any representation of color or texture. STL files may be created by optical scanners and can be used to create replicas of the shape defined in the STL file by the use of 3D printers.

Figure 21:
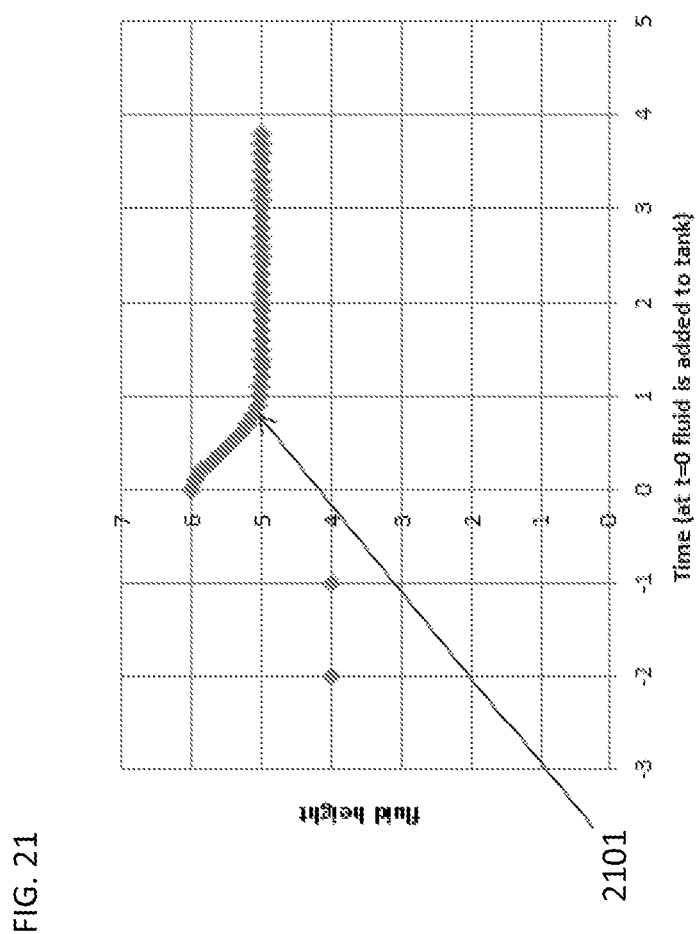
FIGS. 21 and 22 show illustrative depictions of measurement techniques used in accordance with some embodiments of the invention.
Figure 22:
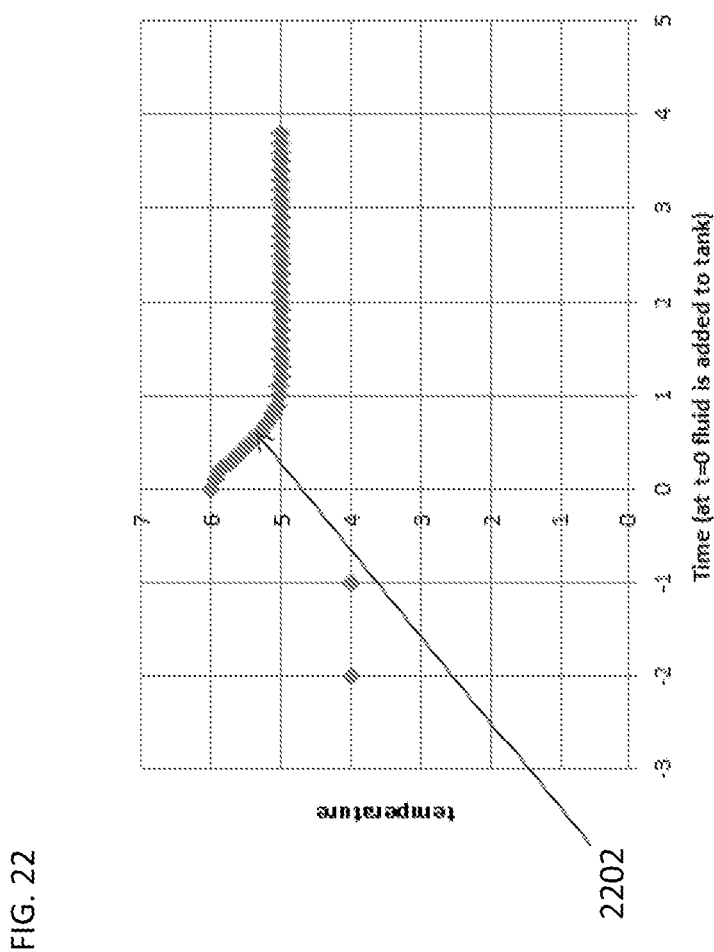

In addition to fluid displacement at each fluid height, other useful information for a given DUT may be obtained (e.g., fluid conductivity or thermal conductivity of the DUT can be obtained). For example, fluid conductivity of the DUT can be used to determine whether porous matter is contained within the displacement slice. As another example, thermal conductivity may reveal additional information about the material properties of the DUT. As shown in FIGS. 20A and 20B, for example, DUT 2020 may be placed within container 2010. DUT 2020 may be a collection of multiple objects (e.g., DUTs 2021 and 2022). At a certain time, additional fluid quantity 2031 may be added to fluid quantity 2030. After some time, additional fluid quantity 2031 may soak into DUT 2020. The rate of absorption ("Q") of additional fluid quantity 2031 into DUT 2020 may be defined from a fluid mechanics equation in the form of the following formula (4):

$$Q=C \times (P1-P2)$$

where element Q of formula (4) may be the rate of flow of additional fluid quantity 2031 into DUT 2020 per surface area, element C may be the conductivity of DUT 2020, which may depend upon the material properties of DUT 2020, and (P1-P2) may represent the difference in pressure of the added height of fluid quantity 2030 after additional fluid quantity 2031 has been added relative to the previous height of fluid quantity 2030. During measurement of a given displacement slice, the time required for the fluid quantity 2030 to settle after dispensing additional fluid quantity 2031 can be recorded. Knowing the surface area of DUT 2020 at each fluid level, which can be obtained from the 3D reconstruction in accordance with some embodiments of the invention, the fluid conductivity of DUT 2020 can be calculated from fluid height versus time information. For example, as shown in FIG. 21, trace 2101 may represent the height of fluid quantity 2030 over time. At a certain time (e.g., t=0) additional fluid quantity 2031 may be added and the settling time for the height of fluid quantity may be observed. For example, if the time required for fluid quantity 2030 to settle is very short, then DUT 2020 can be deemed non-porous. However, if fluid quantity 2030 exhibits a settling behavior, then DUT 2020 can be determined to be a porous medium within the displacement slice. Additionally, the degree of fluid conductivity of DUT 2020 can be determined from formula (4). Thermal conductivity of a displacement slice can be measured in the same manner as the fluid conductivity. For example, FIG. 22 may show trace 2202 that may represent the temperature of fluid quantity 2030 over time. If the temperature of additional fluid quantity 2031 is different than the temperature of fluid quantity 2030 in container 2010, the rate of temperature change of fluid quantity 2030 can be observed. The equation for finding the thermal conductivity of DUT 2020 may be similar to formula (4) and may be in the form of formula (5):

$$Q=C \times (T1-T2)$$

where the difference in the pressures (e.g., fluid height) may be replaced by the difference in the temperatures between fluid quantity 2030 and additional fluid quantity 2031.

Figure 23:
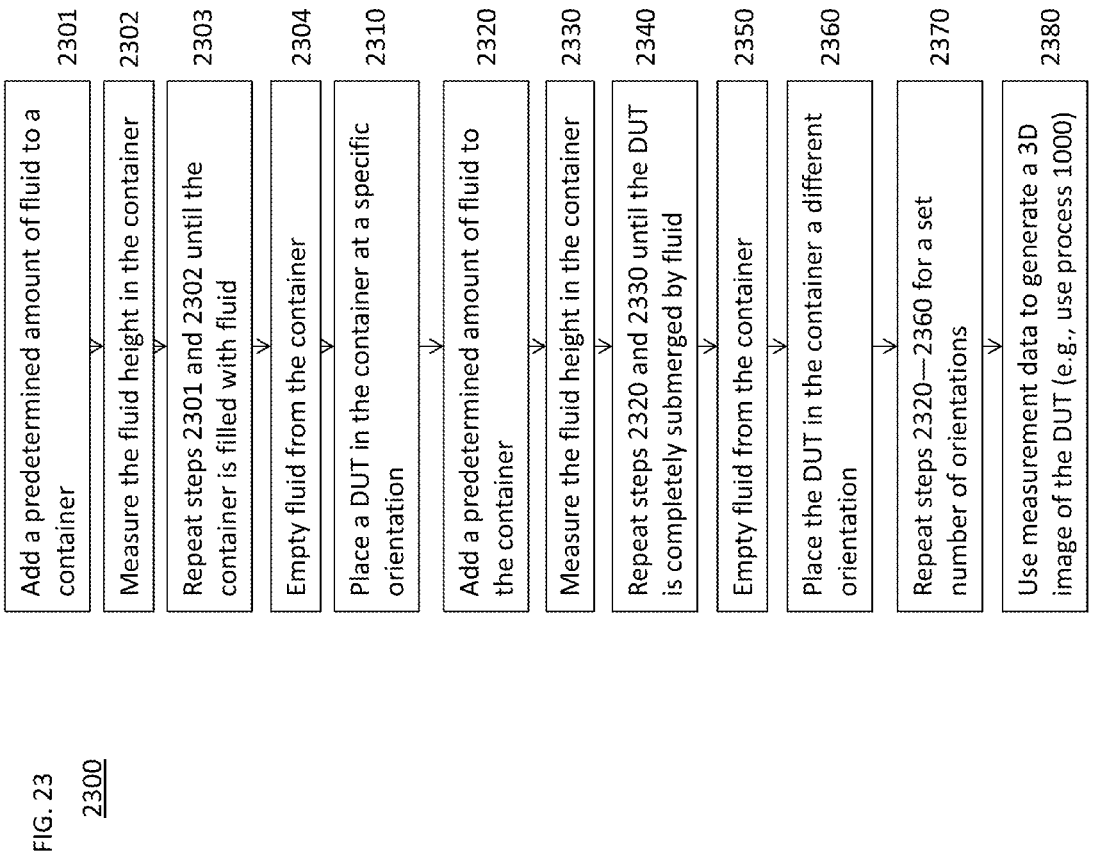
FIG. 23 shows a flowchart of an illustrative process for scanning objects in accordance with some embodiments of the invention.

FIG. 23 shows a flowchart for an illustrative process 2300 for reconstructing a three-dimensional rendering of a DUT in accordance with some embodiments. It is to be understood that the steps shown in process 2300 of FIG. 23 are merely illustrative and that existing steps may be modified or omitted, additional steps may be added (e.g., steps shown in FIG. 23 may be repeated), and the order of certain steps may be altered. In step 2301, a predetermined amount of fluid may be added to a suitable container (e.g., similar to containers in FIGS. 1-3C, 8, and 9). An immersion cage (e.g., similar to immersion cages in FIGS. 7-9) may optionally be included in the container at step 2301 (e.g., a cage that is not yet supporting a DUT). In step 2302, the fluid height in the container may be measured using any suitable technique (e.g., using techniques described with respect to FIGS. 1-3C, 9, and 12-13C). In step 2303, steps 2301 and 2302 may be repeated until the container is completely filled with fluid or until the height of the fluid in the container has reached a certain height. In step 2304, the container may be emptied. While fluid is being emptied from the container in step 2304, additional measurements may be taken. In some embodiments, if an immersion cage is used and the immersion cage is not symmetric, steps 2301-2304 may be repeated for a set number of orientations of the immersion cage with respect to the container (e.g., enough orientations to capture the asymmetry of the immersion cage). In step 2310, a DUT may be placed within the container at a specific orientation with respect to the container. The DUT may be secured in the container in any suitable way (e.g., similar to methods described with respect to FIGS. 1-30), including within an immersion cage (e.g., as described with respect to FIGS. 7-9). In step 2320, a predetermined amount of fluid may be added to the container. In step 2330, the fluid height in the container may be measured using any suitable technique (e.g., using techniques described with respect to FIGS. 1-3C, 9, and 12-13C). In step 2340, steps 2320 and 2330 may be repeated until the DUT may be completely submerged by fluid. In step 2350, the container may be emptied. While fluid is being emptied from the container in step 2350, additional measurements may be taken. In step 2360, the DUT may be placed in the container at a different orientation with respect to the container than the orientation of step 2310 (e.g., by altering the face of a cage that may rest on the bottom of the container). In step 2370, steps 2320-2360 may be repeated for any number of orientations of the DUT with respect to the container. Alternatively, only one orientation may be used and process 2300 may jump from step 2350 to step 2380. In step 2380, the measurement data may be used to generated a 3D image of the DUT (e.g., using a process similar to process 1000)

The processes described with respect to FIGS. 1-24, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic device to another electronic device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

While there have been described systems, methods, and computer-readable media for three-dimensional fluid scanning, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims.

Therefore, those skilled in the art will appreciate that the invention can be practiced by other than the described embodiments, which are presented for purposes of illustration rather than of limitation.

What is claimed is:

1. A method comprising: causing, using a motion control stage, a first predetermined amount of fluid to be added into a container;
   determining, using at least one capacitive probe, a first fluid height in the container after the first predetermined amount of fluid has been added;
   causing, using the motion control stage, a second predetermined amount of fluid to be added into the container when the first predetermined amount of fluid is in the container;
   determining, using the at least one capacitive probe, a second fluid height in the container after the second predetermined amount of fluid has been added;
   causing, using the motion control stage, the first predetermined amount of fluid and the second predetermined amount of fluid to be removed from the container; positioning an object in the container at a first orientation with respect to the container; causing, using the motion control stage, the first predetermined amount of fluid to be added into the container when the object is positioned in the container at the first orientation;
   determining, using the at least one capacitive probe, a third fluid height in the container after the first predetermined amount of fluid has been added;
   causing, using the motion control stage, the second predetermined amount of fluid to be added into the container when the object is positioned in the container at the first orientation and when the first predetermined amount of fluid is in the container; determining, using the at least one capacitive probe, a fourth fluid height in the container after the second predetermined amount of fluid has been added; and generating a three-dimensional image of the object representing a mass pattern or probability of mass of the object by solving a linear model of the object using the first measured fluid height, the second measured fluid height, the third measured fluid height, and the fourth measured fluid height.

2. The method of claim 1, further comprising: causing, using the motion control stage and after the fourth fluid height has been measured, the first predetermined amount of fluid and the second predetermined amount of fluid from the container;
   positioning the object into the container at a second orientation with respect to the container;
   causing, using the motion control stage, the first predetermined amount of fluid to be added into the container when the object is positioned in the container at the second orientation;
   determining, using the at least one capacitive probe, a fifth fluid height in the container after the first predetermined amount of fluid has been added;
   causing, using the motion control stage, the second predetermined amount of fluid to be added into the container when the object is positioned in the container at the second orientation and when the first predetermined amount of fluid is in the container; and determining, using the at least one capacitive probe, a sixth fluid height in the container after the second predetermined amount of fluid has been added.

3. The method of claim 2, wherein generating the three-dimensional image of the object comprises:
generating the three-dimensional image of the object using the first fluid height, the second fluid height, the third fluid height, the fourth fluid height, the fifth fluid height, and the sixth fluid height.

4. A method comprising: determining a plurality of amounts of fluid displacement of an object within a container at various orientations of the object with respect to the container;
wherein the steps of determining the plurality of amounts of fluid displacement comprises: causing, using a motion control stage, a first predetermined amount of fluid to be added into the container at each of the various orientations;
determining, using at least one capacitive probe, a first fluid height in the container after the first predetermined amount of fluid has been added at each of the various orientations;
causing, using the motion control stage, a second predetermined amount of fluid to be added into the container when the first predetermined amount of fluid is in the container at each of the various orientations;
determining, using the at least one capacitive probe, a second fluid height in the container after the second predetermined amount of fluid has been added at each of the various orientations; and
the steps of determining the amount of fluid displacement are repeated twice, once when the object is not positioned in the container, and second when the object is positioned in the container;
populating a linear model with the plurality of amounts of fluid displacement; and
solving the linear model to obtain a solution for a mass density or a probability of mass of the object.

5. The method of claim 4, further comprising: applying a solver routine to the solution to obtain an updated model; and
generating a three-dimensional image of the object based on the updated model.

6. The method of claim 5, further comprising, after the solving, at least one of: rounding mass density results of the solution; and removing at least one voxel from the solution.

* * * * *